United States Patent
Delp et al.

(10) Patent No.: US 10,632,893 B2
(45) Date of Patent: Apr. 28, 2020

(54) TRANSPORTATION SYSTEM INCLUDING AUTONOMOUS DETACHABLE ENGINE MODULES AND PASSENGER MODULE

(71) Applicant: Toyota Motor Engineering & Manufacturing North America, Inc., Plano, TX (US)

(72) Inventors: Michael J. Delp, Ann Arbor, MI (US); Christopher M. Higgins, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/278,346

(22) Filed: Feb. 18, 2019

(65) Prior Publication Data

US 2019/0176676 A1    Jun. 13, 2019

Related U.S. Application Data

(63) Continuation of application No. 15/239,071, filed on Aug. 17, 2016, now Pat. No. 10,245,994.

(51) Int. Cl.
*B60P 3/07* (2006.01)
*B62D 63/02* (2006.01)
(Continued)

(52) U.S. Cl.
CPC ............... *B60P 3/073* (2013.01); *B60D 1/00* (2013.01); *B62D 63/025* (2013.01);
(Continued)

(58) Field of Classification Search
CPC .......... B60P 3/073; B60D 1/00; G06Q 50/00; G06Q 50/30; G06Q 10/0631; B62D 63/025
See application file for complete search history.

(56) References Cited

U.S. PATENT DOCUMENTS 3,882,951 A    5/1975    Conley
5,995,882 A *  11/1999   Patterson ................ B63C 11/42
                                              114/312
(Continued)

FOREIGN PATENT DOCUMENTS

EP            1592607 A1    11/2005

*Primary Examiner* — Rodney A Butler
(74) *Attorney, Agent, or Firm* — Christopher G. Darrow; Darrow Mustafa PC

(57) ABSTRACT

A computing system for an autonomous engine module stores a self-driving capability and is configured to determine, by communication between an autonomous engine module in which the computing system resides and other autonomous engine modules, and responsive to a user request for use of an autonomous engine module, at least one suitable autonomous engine module use candidate. The computing system may also generate a notification directed to the user including information relating to the at least one suitable autonomous engine module use candidate. The computing system may also receive a selection by the user of an autonomous engine module use candidate. The computing system may also, using the self-driving capability, autonomously drive the autonomous engine module to a designated pickup location responsive to selection by the user of the autonomous engine module as the autonomous engine module use candidate.

20 Claims, 12 Drawing Sheets

(51) Int. Cl.
    *G06Q 10/06*     (2012.01)
    *G06Q 50/30*     (2012.01)
    *B60D 1/00*     (2006.01)
    *G06Q 50/00*     (2012.01)
    *B60P 3/073*     (2006.01)

(52) U.S. Cl.
    CPC ......... *G06Q 10/0631* (2013.01); *G06Q 50/00* (2013.01); *G06Q 50/30* (2013.01)

(56) References Cited

U.S. PATENT DOCUMENTS

| | | | |
|---|---|---|---|
| 6,138,783 A * | 10/2000 | Chene | B61D 13/00 |
| | | | 180/11 |
| 7,066,291 B2 | 6/2006 | Martins et al. | |
| 8,352,112 B2 | 1/2013 | Mudalige | |
| 9,120,485 B1 | 9/2015 | Dolgov | |
| 9,511,767 B1 | 12/2016 | Okumura et al. | |
| 2004/0093650 A1 | 5/2004 | Martins et al. | |
| 2005/0091953 A1* | 5/2005 | Turner | A01D 34/006 |
| | | | 56/10.2 R |
| 2015/0015017 A1* | 1/2015 | Benoliel | B61B 15/00 |
| | | | 296/26.02 |
| 2015/0045992 A1 | 2/2015 | Ashby et al. | |
| 2016/0301698 A1 | 10/2016 | Katara et al. | |
| 2017/0227960 A1* | 8/2017 | Joyce | G05D 1/0061 |

\* cited by examiner

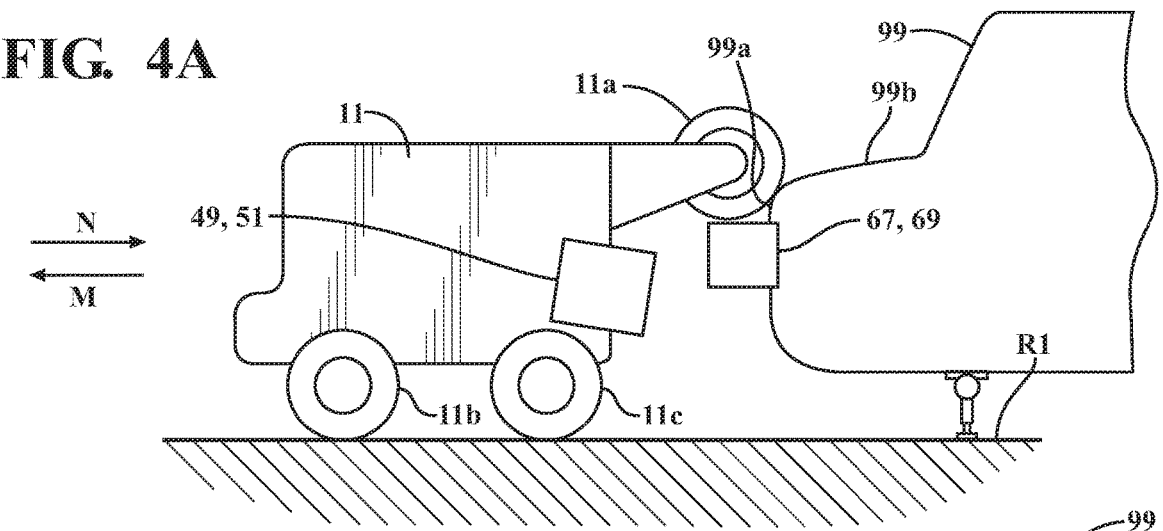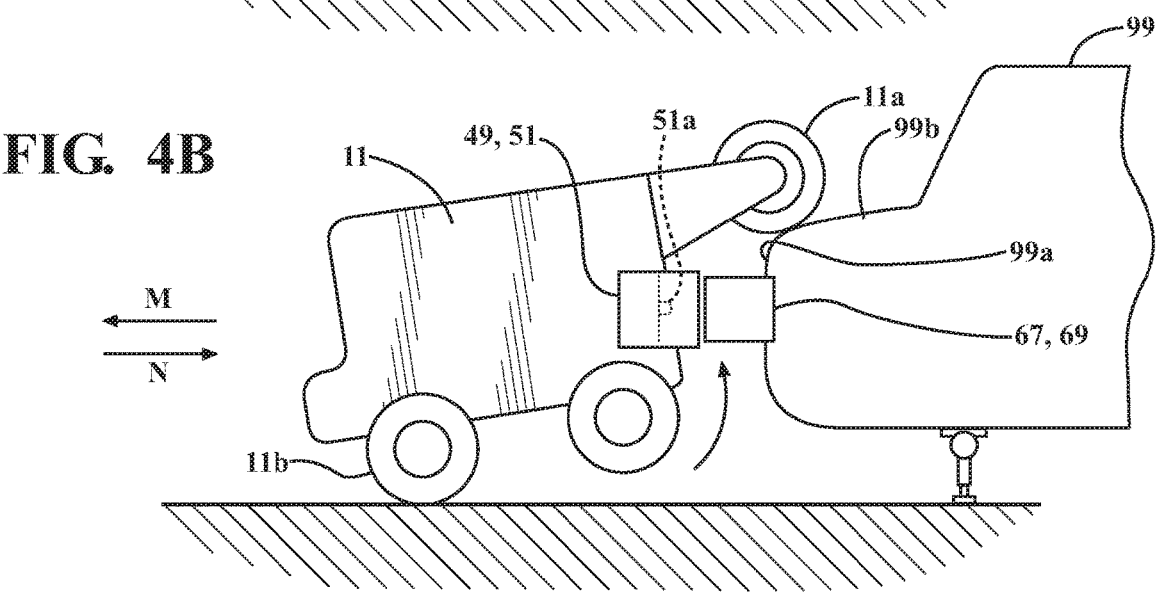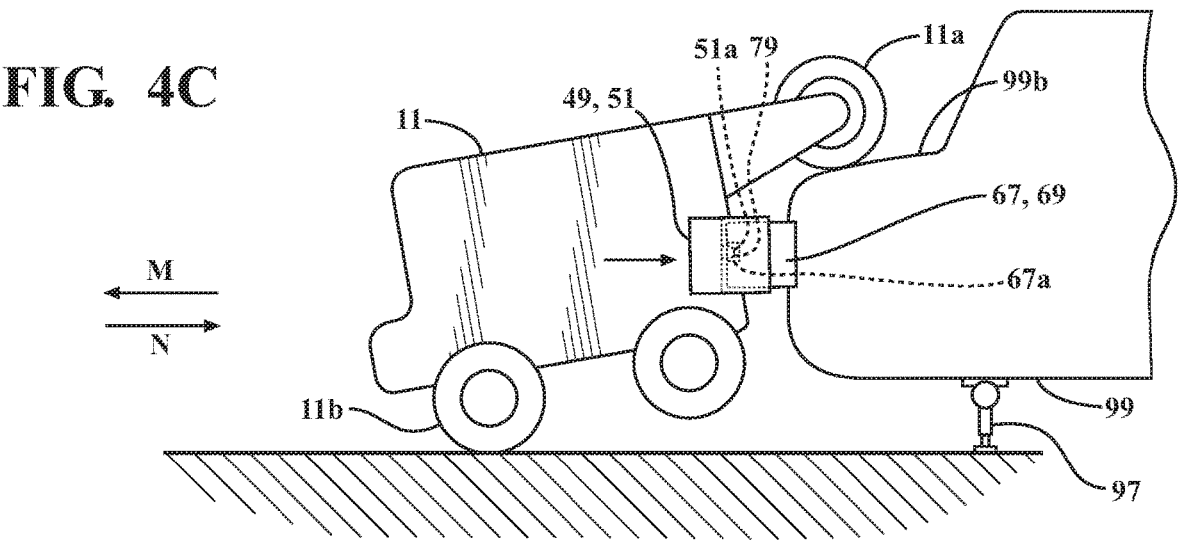

TRANSPORTATION SYSTEM INCLUDING AUTONOMOUS DETACHABLE ENGINE MODULES AND PASSENGER MODULE

CROSS REFERENCE TO RELATED APPLICATIONS

This application is a continuation of, and claims the benefit of, U.S. application Ser. No. 15/239,071, filed on Aug. 17, 2016.

TECHNICAL FIELD

The present invention relates to autonomous vehicles and, more particularly, to an engineless passenger module and a detachable autonomous engine module which is dockable with the passenger module to form an autonomous passenger vehicle.

BACKGROUND

Fully autonomous passenger vehicles are designed or contemplated which are capable of driving themselves and any onboard passengers and/or cargo between locations without any input from a human driver. However in an autonomous vehicle, there is no reason for a passenger or cargo compartment unless the vehicle is transporting passengers or cargo. Thus, unless the vehicle is transporting passengers or cargo, the autonomous vehicle may spend a large amount of time moving an essentially empty vehicle between locations. This is wasteful of fuel.

In addition, the transportation needs of a user may vary with a given situation. If the user needs to tow a trailer, the user's conventional passenger vehicle may not have the capacity to effect the tow. Alternatively, the user's conventional passenger vehicle may be a pickup truck or sport utility vehicle with an engine and transmission engineered for transporting heavy loads. If the user wishes to take a long trip carrying a light or moderate load along a route consisting predominantly of expressway travel, a pickup truck or sport utility vehicle may not be the best choice for such a trip. Thus, the engine and transmission of a conventional passenger vehicle (even an automated passenger vehicle) is frequently not suited to the transportation need it is called upon to meet.

SUMMARY

In one aspect of the embodiments described herein, a computing system for an autonomous engine module is provided. The computing system includes one or more engine module computing system processors for controlling operation of the engine module computing system, and an engine module computing system memory for storing data and program instructions usable by the one or more engine module computing system processors. The engine module computing system memory stores a self-driving capability. The engine module computing system determines, by communication between an autonomous engine module in which the computing system resides and at least one other autonomous engine module of a plurality of autonomous engine modules including the autonomous engine module in which the computing system resides, and responsive to a user request for use of an autonomous engine module of the plurality of autonomous engine modules, at least one suitable autonomous engine module use candidate from the plurality of autonomous engine modules. The engine module computing system may also generate, responsive to a determination of at least one suitable autonomous engine module use candidate, a notification directed to the user including information relating to the at least one suitable autonomous engine module use candidate. The engine module computing system may also receive a selection by the user of an autonomous engine module use candidate. The engine module computing system may also, using the self-driving capability, control the autonomous engine module to autonomously drive the autonomous engine module to a designated pickup location responsive to selection by the user of the autonomous engine module as the autonomous engine module use candidate.

In another aspect of the embodiments described herein, a computer-implemented method is provided. The method includes a step of determining, by communication between a first autonomous engine module and at least one other autonomous engine module of a plurality of autonomous engine modules including the first autonomous engine module, and responsive to a user request for use of an autonomous engine module of the plurality of autonomous engine modules, at least one suitable autonomous engine module use candidate from the plurality of autonomous engine modules. The method also includes a step of generating a notification directed to the user including information relating to the at least one suitable autonomous engine module use candidate. The method also includes a step of receiving a selection by the user of an autonomous engine module use candidate. The method also includes a step of controlling the first autonomous engine module to autonomously drive the first autonomous engine module to a designated pickup location responsive to selection by the user of the first autonomous engine module as the autonomous engine module use candidate.

In another aspect of the embodiments described herein, a non-transitory computer readable medium is provided. The non-transitory computer readable medium has stored therein instructions executable by a computer system to cause the computer system to perform functions. The functions include determining, by communication between a first autonomous engine module and at least one other autonomous engine module of a plurality of autonomous engine modules including the first autonomous engine module, and responsive to a user request for use of an autonomous engine module of the plurality of autonomous engine modules, at least one suitable autonomous engine module use candidate from the plurality of autonomous engine modules. The functions also include generating, responsive to a determination of at least one suitable autonomous engine module use candidate from the plurality of autonomous engine modules, a notification directed to the user including information relating to the at least one suitable autonomous engine module use candidate. The functions also include receiving a selection by the user of an autonomous engine module use candidate from the at least one suitable autonomous engine module use candidate. The functions also include controlling the first autonomous engine module to autonomously drive the first autonomous engine module to a designated pickup location responsive to selection by the user of the first autonomous engine module as the autonomous engine module use candidate from the at least one suitable autonomous engine module use candidate.

Embodiments of the transportation system described herein enable a user to customize and personalize a passenger module, which would be propelled to a destination using an autonomous engine module. An autonomous engine module may automatically dock with the passenger module, propel the passenger module to a destination, park the passenger module in a designated location, and detach itself from the passenger module for a subsequent use elsewhere. The engine module may be selected from a plurality of available engine module candidates based on the user's particular need. The user may own the passenger module but does not own or maintain the engine module. The ability to forego ownership of a vehicle having many or all of the high-maintenance vehicle systems (such as an engine and transmission) needed to propel the vehicle, and the ability to specify an engine module optimized for a particular use, may combine to drastically reduce the costs of vehicle ownership.

BRIEF DESCRIPTION OF THE DRAWINGS

FIGS. 4A-4C are schematic diagrams illustrating mating of embodiments of electrical/power connection modules and docking mechanisms during docking of an engine module with a passenger module, in accordance with certain embodiments described herein.

DETAILED DESCRIPTION

Embodiments described herein relate to a transportation system and method for enabling a user to schedule the use of an engine module for propelling a passenger module which is separable from the engine module and is securable to the engine module for transportation purposes. The engine module includes a motive power system (i.e., engine, transmission, etc.), a braking system, a steering system, a throttle system, a computing system for control, and any other systems or elements needed for the engine module to implement an autonomous self-driving capability, for docking with and securing to a passenger module, for providing power to the passenger module systems, for transporting or propelling the passenger module from a start location to one or more destinations, and for any other engine module-related purposes described herein. The engine module may not include any passenger accommodations or driver-related features, such as a steering wheel. The engine module may be configured only for self-driving and fully automated steering. The passenger module may incorporate any systems or features usable or desirable by a passenger during a fully automated driving experience. The passenger module may not include an engine or means of propulsion, but rather relies on the engine module for propulsion.

Figure 1:
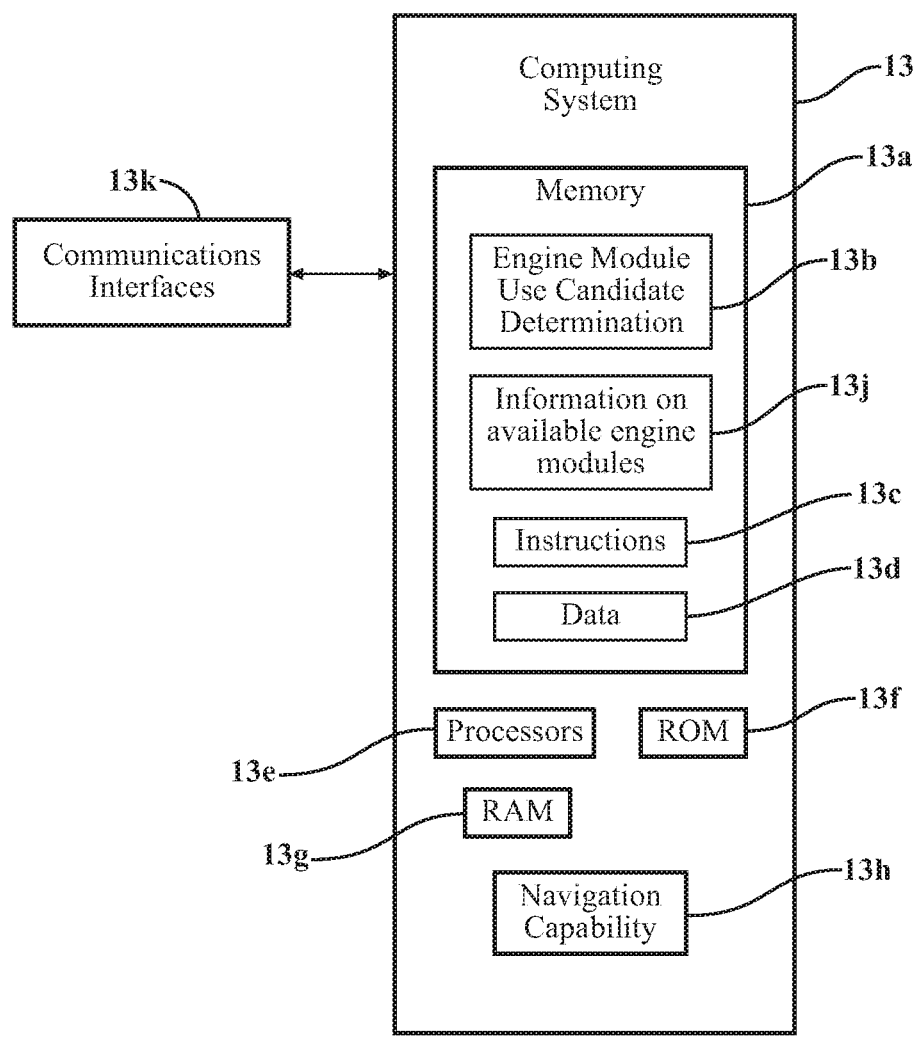
FIG. 1 illustrates a block diagram of an exemplary computing system configured for use in a transportation system according to one or more illustrative embodiments of the disclosure.

FIG. 1 illustrates a block diagram of an exemplary computing system 13 configured for use in a transportation system according to one or more illustrative embodiments of the disclosure. The computing system 13 may have some or all of the elements shown in FIG. 1, and may also include additional components as needed or desired for particular applications. The computing system 13 may incorporate some or all of the elements shown in FIG. 1 at a single location. Alternatively, the computing system 13 may represent or be embodied in a plurality of computing and related devices in operative communication with each other, which may process information and/or perform the various functions described herein in a distributed or decentralized fashion.

The computing system 13 may include one or more processors 13e (which could include at least one microprocessor) for controlling overall operation of the computing system 13 and associated components, and which execute instructions stored in a non-transitory computer readable medium, such as the memory 13a. "Processor" means any component or group of components that are configured to execute any of the processes and/or process steps described herein or any form of instructions to carry out such processes/process steps or cause such processes/process steps to be performed. The processor(s) 13e can include at least one hardware circuit (e.g., an integrated circuit) configured to carry out instructions contained in program code. In arrangements in which there is a plurality of processors 13e, such processors can work independently from each other or one or more processors can work in combination with each other.

In some embodiments, the computing system 13 may include RAM 13g, ROM 13f, and/or any other suitable form of computer-readable memory. The memory 13a may comprise one or more computer-readable memories. A computer-readable storage or memory 13a includes any medium that participates in providing data (e.g., instructions), which may be read by a computer. Such a medium may take many forms, including, but not limited to, non-volatile media, volatile media, etc. The memory or memories 13a can be a component of the computing system 13, or the memory or memories can be operatively connected to the computing system 13 for use thereby. The term "operatively connected," as used throughout this description, can include direct or indirect connections, including connections without direct physical contact.

The memory 13a may contain data 13d and/or instructions 13c (e.g., program logic) executable by the processor(s) 13e to execute one or more of the various functions described herein. The memory 13a may contain additional instructions as well, including instructions to (directly or through communications interfaces 13k) transmit information to, receive information from, interact with or control one or more of the various autonomous engine modules, users, and/or passenger modules as described herein. In addition to the instructions 13c, the memory 13a may store data such as roadway maps and path information, among other information. Such information may be used by the computing system (either alone or in conjunction with an associated navigation capability 13h) in calculating and evaluating various routes that may be taken by the engine modules prior to or during transportation of a passenger module for a given application. The navigation capability 13h may be incorporated into the computing system 13, or the navigation capability 13h may be embodied in a separate navigation unit (not shown) in operative communication with the computing system. Also, the memory 13a may incorporate an embodiment of an engine module use candidate determination capability 13b, as described in greater detail below.

In one or more arrangements, the computing system 13 described herein can incorporate artificial or computational intelligence elements, e.g., neural network, reinforcement learning or other machine learning algorithms. Further, in one or more arrangements, the hardware and/or software elements configured for performing particular functions or operations described herein may be distributed among a plurality of elements and/or locations.

Computing system 13 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown). Any other computing systems or devices in operative communication with computing system 13 may include devices installed in vehicles, mobile devices that may travel within vehicles, or devices outside of vehicles. Thus, any terminals or devices in operative communication with the computing system 13 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband and the like)(not shown), and may include or be configured to interface with some or all of the elements described above with respect to the computing system 13. In addition, any of these device embodiments may include a haptic interface or may be configured to provide haptic feedback to a user to inform the user of any information or condition which should be communicated to a user of any transportation system embodiment described herein.

Communications interfaces 13k may be configured to enable interaction between the computing system 13 and any users of an embodiment of the transportation system, any passenger modules and autonomous engine modules which are part of a network, other computing systems, and various external messaging and communications systems (such as satellite and navigation systems, cellular or wireless communication systems, and any other systems or elements which may facilitate performance of the functions described herein). The communications interfaces 13k may be incorporated into the computing system 13 or may be located spaced apart from the computing system and communicatively coupled to the computing system. The communications interfaces 13k may be configured to communicate with various message servers or message storage and retrieval entities (not shown) tasked for storing messages transmitted to or from one or more engine modules, passenger modules an owner/user and/or other entities.

The communications interfaces 13k may include a user interface for providing information to or receiving input from a user of the transportation system. For example, the communications interfaces 13k may include a voice/audio interface (not shown) (for example, a microphone and speaker for providing audio input and output), keypad, touch screen, and/or stylus through which a user of the computing system 13 may provide input, and may also include and a video display device (not shown) for providing textual, audiovisual and/or graphical output from the computing system. The computing system 13 may be configured to interpret or process any received audio input as a response to a query or an instruction for the computing system. The user interface may control or enable control of content and the layout of interactive images that may be displayed on the display. A display in the form of a touch screen may provide information to a user of the transportation system, and may also be operable to accept input from the user via the touch screen. The display can also be any other suitable type of display.

The communications interfaces 13k may also include interfaces enabling communication in a wide area network (WAN), one or more wireless telecommunications networks, and/or other communications networks. When used in a WAN networking environment, the computing system 13 may include (or be operatively connected to) a modem or other means for establishing communications over the WAN. When used in a wireless telecommunications network, the computing system 13 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving information from external various sources. The communication networks can also include wired communication links. The communication network(s) can include any combination of the above networks and/or other types of networks.

Figure 2:
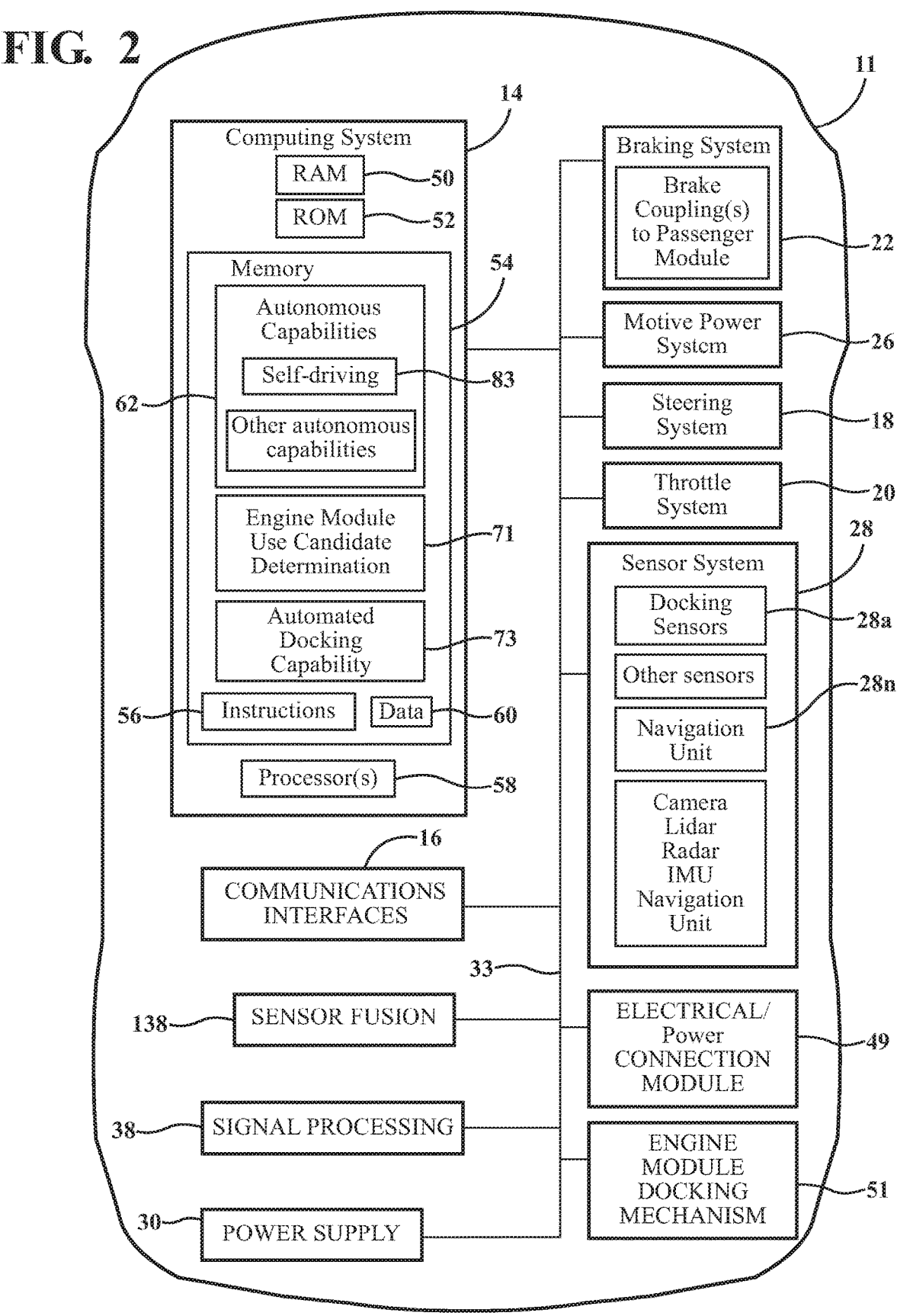
FIG. 2 is a functional block diagram illustrating an autonomous engine module in accordance with an example embodiment.

FIG. 2 is a functional block diagram illustrating an autonomous engine module 11 in accordance with an example embodiment. The engine module may be configured for completely autonomous driving operations (i.e., for self-driving, without the presence of a driver or any human input) from a start location to a given destination along a route determined by a navigation unit or system, for example. The engine module may be configured to operate the throttle, braking and other systems during performance of self-driving operations.

Embodiments of the engine module described herein may also include systems and components needed for determining one or more routes for self-driving; for communicating with various users, computing systems, passenger modules, other engine modules, and other entities; for docking with a passenger module, and for propelling the passenger module as described herein. The engine module embodiments may not be configured for transporting passengers by themselves, without an attached passenger module. Thus, features and accommodations designed for passengers and drivers and appearing in conventional motor vehicles may not be included in the engine module embodiments described herein.

The engine module 11 may include various systems, subsystems and components in operative communication with each other, such as a sensor system or array 28, a computing system 14, one or more communications interfaces 16, a steering system 18, a throttle system 20, a braking system 22, a power supply 30, a motive power system 26, and other systems and components needed for operating the engine module as described herein. The engine module 11 may include more or fewer subsystems and each subsystem could include multiple elements. Further, each of the subsystems and elements of engine module 11 could be interconnected. Thus, one or more of the described functions of the engine module 11 may be divided up into additional functional or physical components or combined into fewer functional or physical components.

The sensor system 28 may include a number of sensors configured to sense information about an external environment of the engine module 11. Sensors of engine module sensor system 28 may include any sensors required to support any self-driving capabilities and/or associated autonomous capabilities incorporated into the engine module 11. Various examples of different types of sensors are described herein. However, it will be understood that the embodiments are not limited to the particular sensors described. In arrangements in which the sensor system 28 includes a plurality of sensors, the sensors can work independently from each other, or two or more of the sensors can work in combination with each other. Sensors of the sensor system 28 may be operatively connected to the computing system 14 and/or any other element of the engine module 11.

For example, the sensor system 28 may include a navigation unit 28n such as a Global Positioning System (GPS), an inertial measurement unit (IMU), a RADAR unit, a laser rangefinder/LIDAR unit, and one or more cameras comprising devices configured to capture a plurality of images of an external environment of the engine module 11. The camera(s) may be still cameras or video cameras. The IMU may incorporate any combination of sensors (e.g., accelerometers and gyroscopes) configured to sense position and orientation changes of the engine module 11 based on inertial acceleration. For example, the IMU may sense such parameters as the roll rate, yaw rate, pitch rate, longitudinal acceleration, lateral acceleration, and vertical acceleration of an engine module or an engine module and passenger module attached thereto.

The navigation unit may be any sensor or sensors configured to estimate a geographic location of the engine module 11. The navigation unit may also be configured to determine or plan a driving route from a given start point (for example, a current location of the engine module or another designated start location) to a selected destination, using stored and/or available maps, in a manner known in the art. To these ends, the navigation unit may include a one or more transceivers, including a transceiver operable to provide information regarding the position and/or movement of the engine module 11 with respect to Earth.

In addition, if desired, docking sensors 28a may be provided to aid in docking the engine module 11 with a passenger module. The docking sensors 28a may include any suitable type of sensor, including cameras (with an associated image processing capability included in computing system 14), proximity sensors, and/or other sensors designed to aid in positioning the engine module prior to and during docking, and for confirming that mechanical and electrical docking have taken place.

In a known manner, the various engine module sensors 28 may provide data used by the engine module computing system 14 in formulating and executing suitable control commands for the various engine module systems. For example, data from inertial sensors, wheel speed sensors, road condition sensors, and steering angle sensors may be processed in formulating and executing a command in steering system 18 to turn the engine module.

Information from particular engine module sensors may be processed and used to control more than one engine module system or component. For example, various road condition sensors may be provided to supply information to the engine module computing system to enable the computing system to process the road condition information in accordance with stored processor-executable instructions, and to formulate appropriate control commands to both the steering system and braking system. The computing system 14 may continuously receive and process an ongoing or continuous flow of information from sensor system 28 and from other information sources. This information is processed and/or evaluated in accordance with instructions stored in a memory, in a manner and for the purposes described herein. The use of "continuously" when referring to the reception, gathering, monitoring, processing, and/or determination of any information or parameters described herein means that the computing system 14 is configured to receive and/or process any information relating to these parameters as soon as the information exists or is detected, or as soon as possible in accordance with sensor acquisition and processor processing cycles.

The engine module 11 may include a suitable signal processing capability 38 for situations where a sensor output signal or other signal requires pre-processing prior to use by the computing system or another engine module system or element, or where a control signal sent from the computing system will require processing prior to use by actuatable sub-systems or sub-system components (for example, components of the steering system or throttle system). The signal processing capability may be an analog-to-digital (A/D) converter or digital-to-analog (D/A) converter, for example.

A sensor fusion algorithm 138 may be an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or another algorithm. The sensor fusion algorithm 138 may further provide various assessments based on data from the sensor system 28. In an example embodiment, the assessments may include evaluations of individual objects or features in the environment of the engine module 11, evaluation of a particular situation, and evaluation of possible impacts based on the particular situation. Other assessments are also possible. The sensor fusion algorithm 138 may be stored on a memory (such as memory 54) incorporated into or in operative communication with computing system 14, and may be executed by the computing system in a manner known in the art.

FIG. 2 also illustrates a block diagram of an engine module computing system 14 according to one or more illustrative embodiments of the disclosure. The computing system embodiment shown in FIG. 2 may be configured similarly to the computing system embodiment shown in FIG. 1. However, the engine module computing system may be configured in any manner suitable for the purposes described herein.

The computing system 14 may have some or all of the elements shown in FIG. 2. In addition, the computing system 14 may also include additional components as needed or desired for particular applications. The computing system 14 may also represent or be embodied in a plurality of controllers or computing devices that may process information and/or serve to control individual components or subsystems of the engine module 11 in a distributed fashion.

The engine module computing system 14 may be operatively connected to the other engine module systems and elements and otherwise configured so as to affect control and operation of the engine module 11 and its components as described herein. The computing system 14 may control the functioning of the engine module systems and/or components autonomously (without human input), based on inputs and/or information received from various subsystems (e.g., motive power system 26, sensor system 28, steering system 18, etc.), from any of the communications interfaces 16, and/or from any other suitable source of information. The computing system may also be configured to autonomously control and/or execute certain additional functions.

The computing system 14 may include one or more processors 58 (which could include at least one microprocessor) for controlling overall operation of the computing system 14 and associated components, and which executes instructions stored in a non-transitory computer readable medium, such as the memory 54. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be main processor(s) of the engine module 11. For instance, the processor(s) 58 can be part of an electronic control unit (ECU).

The computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. The memory or memories 54 can be a component of the computing system 14, or the memory or memories can be operatively connected to the computing system 14 for use thereby.

The memory 54 may contain data 60 and/or instructions 56 (e.g., program logic) executable by the processor(s) 58 to execute various functions of the engine module 11. The memory 54 may contain additional instructions as well, including instructions to (directly or through communications interfaces 16) transmit information to, receive information from, interact with, or control one or more of the engine module systems and/or components described herein (for example, motive power system 26, sensor system 28, computing system 14, and the communication interfaces 16). In addition to the instructions 56, the memory 54 may store data such as roadway maps, path information, among other information. Such information may be used by the computer system 14 (either alone or in conjunction with an associated navigation unit 28n) in calculating and evaluating various routes that may be taken by the engine module prior to or during transportation of a passenger module for a given application.

The computing system 14 may be configured to coordinate control of the various actuatable engine module systems and components so as to implement one or more autonomous capabilities (generally designated 62), including a self-driving capability 83. These autonomous capabilities 62 may be stored in memory 54 and/or in other memories and implemented in the form of computer-readable program code that, when executed by a processor, implement one or more of the various processes, instructions or functions described herein.

For example, the self-driving capability 83 may enable autonomous operation of the engine module 11 so as to drive the module from its current location to any specified end location. U.S. application Ser. No. 14/789,004, the disclosure of which is incorporated herein by reference in its entirety, describes methods and systems usable for controlling an autonomously operable vehicle while traveling from a start location to a designated end location. Other methods and systems may be used instead of or in addition to the methods and systems described in the '004 application. The engine module computing system 14 may be configured to (responsive to inputs from the navigation unit 28n and from other sensors, such as cameras) operate the engine module 11 in accordance with traffic lights and traffic signs along the planned route and to perform any other operations and functions necessary for self-driving the engine module to and from designated locations. The navigation unit 28n and other information sources (for example, real-time traffic information sources) may be accessed to provide other information usable by the computing system 14.

The memory 54 may also include an embodiment 71 of an engine module use candidate determination capability, as described in greater detail below. The memory 54 may also include an automated docking capability 73 which may be implemented for docking the engine module to the passenger module.

In one or more arrangements, the computing system 14 can incorporate artificial or computational intelligence elements, e.g., neural network, reinforcement learning or other machine learning algorithms. Further, in one or more arrangements, the hardware and/or software elements configured for performing particular functions or operations described herein may be distributed among a plurality of elements and/or locations.

Computing system 14 may operate in a networked environment supporting connections to one or more remote computers, such as other computing devices, terminals and/or mobile devices (e.g., mobile phones, short-range vehicle communication systems, telematics devices and vehicle-to-vehicle communications systems)(not shown). Any computing systems or devices in operative communication with computing system 14 may include devices installed in vehicles, mobile devices that may travel within vehicles, or devices outside of vehicles that are configured to perform and/or support performance of the operations and functions described herein. Thus, any terminals or devices in operative communication with the computing system 14 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband and the like)(not shown), and may include some or all of the elements described above with respect to the computing system 14. In addition, any of these device embodiments may include a haptic interface or may be configured to provide haptic feedback to a vehicle occupant to inform the occupant of any information or condition which should be communicated to a user of a transportation system as described herein.

Communications interfaces 16 may be configured to allow interaction between the engine module 11 and external sensors, other vehicles, other computer systems, various external messaging and communications systems (such as a satellite system, a cellular phone/wireless communication system, etc.) and/or a user. The communications interfaces 16 may be configured to communicate with various message servers or message storage and retrieval entities, for storing messages transmitted to or from the engine module, a computing system outside the engine module, a user, and/or other entities. For example, messages directed to the engine module and not received by the engine module when the engine module is turned off, may be stored off-module for retrieval by the engine module computing system when the engine module is turned on. This aids in conserving engine module battery power by enabling the engine module communications systems to be deactivated when the engine is off. Alternatively, if desired, the communications systems features and elements needed for messaging may be powered by the engine module power supply 30 or by other means when the engine is off. This capability of the engine module may be enabled through a user interface with the engine module computing system, for example.

The communications interfaces 16 may include one or more interfaces for providing information to computing system 14 or receiving input from another engine module, a user of the engine module 11 or of the transportation system of the engine module, or any other entity. The communications interfaces 16 may also include interfaces enabling communication in a wide area network (WAN), a wireless telecommunications network, and/or other communications networks. The communication network(s) can also include wired communication links. The communication network(s) can include any combination of the above networks and/or other types of networks. When used in a WAN networking environment, the computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information from various external sources.

In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and the engine module 11 and any nearby roadside communications nodes and/or infrastructure.

The engine module 11 may include various actuatable sub-systems and elements in operative communication with computing system 14 and other engine module systems and/or components, and which are operable responsive to control commands received from the computing system. Various actuatable sub-systems and elements may be controlled automatically by computing system 14. FIG. 2 shows just a few examples of actuatable sub-systems 18, 20, 22, 26 which may be incorporated into an engine module. A particular engine module may incorporate one or more of these systems or other systems (not shown) in addition to one or more of the systems shown.

The steering system 18 may include such elements as the engine module wheels, servo-mechanisms, gears, steering knuckles, and/or any other elements or combination of elements that may be operable to enable autonomous adjustment of the heading of engine module 11. As the engine module is operated fully autonomously, a steering wheel and components needed to guide the vehicle using a steering wheel may be omitted.

The motive power system 26 may include components operable to provide powered motion for the engine module 11. In an example embodiment, the motive power system 26 may include an engine (not shown), an energy source (such as gasoline, diesel fuel, hydrogen fuel cell, or a one or more electric batteries in the case of a hybrid engine module), and a transmission (not shown). The engine may be any of (or a combination of) an internal combustion engine, an electric motor, steam engine, Stirling engine, a pure electric engine (i.e., an engine powered by batteries, for example), or other types of engines or motors. In some example embodiments, the motive power system 26 may include multiple types of engines or motors. For instance, a gas-electric hybrid car could include a gasoline engine and an electric motor. Other examples are possible.

The engine, transmission, and other motive power-related components in any given engine module may be optimized at least to some degree for a particular type of use. At the same time, the number of different engine module types may be limited to as few as possible, to help minimize engine module production and operating expenses.

For example, in certain embodiments of the transportation system, each engine module may be optimized to either generate a relatively high torque, to provide a relatively high fuel-efficiency, or to generate a relatively high horsepower. In a particular embodiment, one or more of the engine modules may be optimized to generate a relatively high torque and a relatively high horsepower. This element of specialization may aid the process of determining suitable engine module use candidates, while also helping to identify the most effective and/or cost-efficient engine module(s) for a particular use.

In one example, an engine module optimized or configured for generating a relatively high torque may be the best selection for an application involving the transportation of heavy loads or in a towing application. An engine module optimized or configured for generating a relatively high horsepower may be the best selection for relatively low-load, higher-speed applications. One example of such a high horsepower application may be travel in a dedicated high-speed traffic lane (for example, at speeds of up to 200 miles per hour). An engine module optimized or configured for providing a relatively high fuel-efficiency may be the best selection for longer trips at relatively constant speeds, or for city driving.

In certain embodiments described herein, engine modules optimized for generating a relatively high torque may form a class of engine modules wherein each module in the class may generate a torque within a predetermined range or above a predetermined threshold. Similarly, engine modules optimized for generating a relatively high horsepower may form a class of engine modules wherein each module in the class may generate a horsepower within a predetermined range or above a predetermined threshold. Also, engine modules optimized for providing a relatively high fuel-efficiency may form a class of engine modules wherein each module in the class provides a fuel-efficiency within a predetermined range or above a predetermined threshold. The computing system embodiments described herein may be configured for evaluating parameters of the requested use and identifying the best engine module use candidates for a given application, using these thresholds and methods described herein or other suitable methods.

The braking system 22 could include any combination of elements and/or mechanisms configured to autonomously decelerate the engine module 11. The-braking system may include couplings (for example, hydraulic, electrical, and/or pneumatic couplings) (not shown) configured for operatively connecting the engine module braking system to brakes incorporated into the passenger module (for example, on the module rear wheels). This may enable the engine module braking system to power a passenger module braking system to aid in slowing and stopping the autonomous passenger vehicle created by joining the passenger module to the autonomous engine module.

The throttle system 20 may include elements and/or mechanisms configured to autonomously control, for instance, the operating speed of the engine and, in turn, control the speed of the engine module 11. The power supply 30 may provide power to various components of the engine module 11 and could represent, for example, a rechargeable lithium-ion or lead-acid battery. In some embodiments, one or more banks of such batteries could be configured to provide electrical power. Other power supply materials and configurations are possible.

The engine module 11 may be configured so that the computing system 14, sensor system 28, actuatable subsystems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various engine module systems and components. Alternatively, any of the elements and/or systems described herein may be directly connected to each other without the use of a bus. Also, connections between the elements and/or systems described herein may be through another physical medium (such as wired connections) or the connections may be wireless connections.

Figure 3:
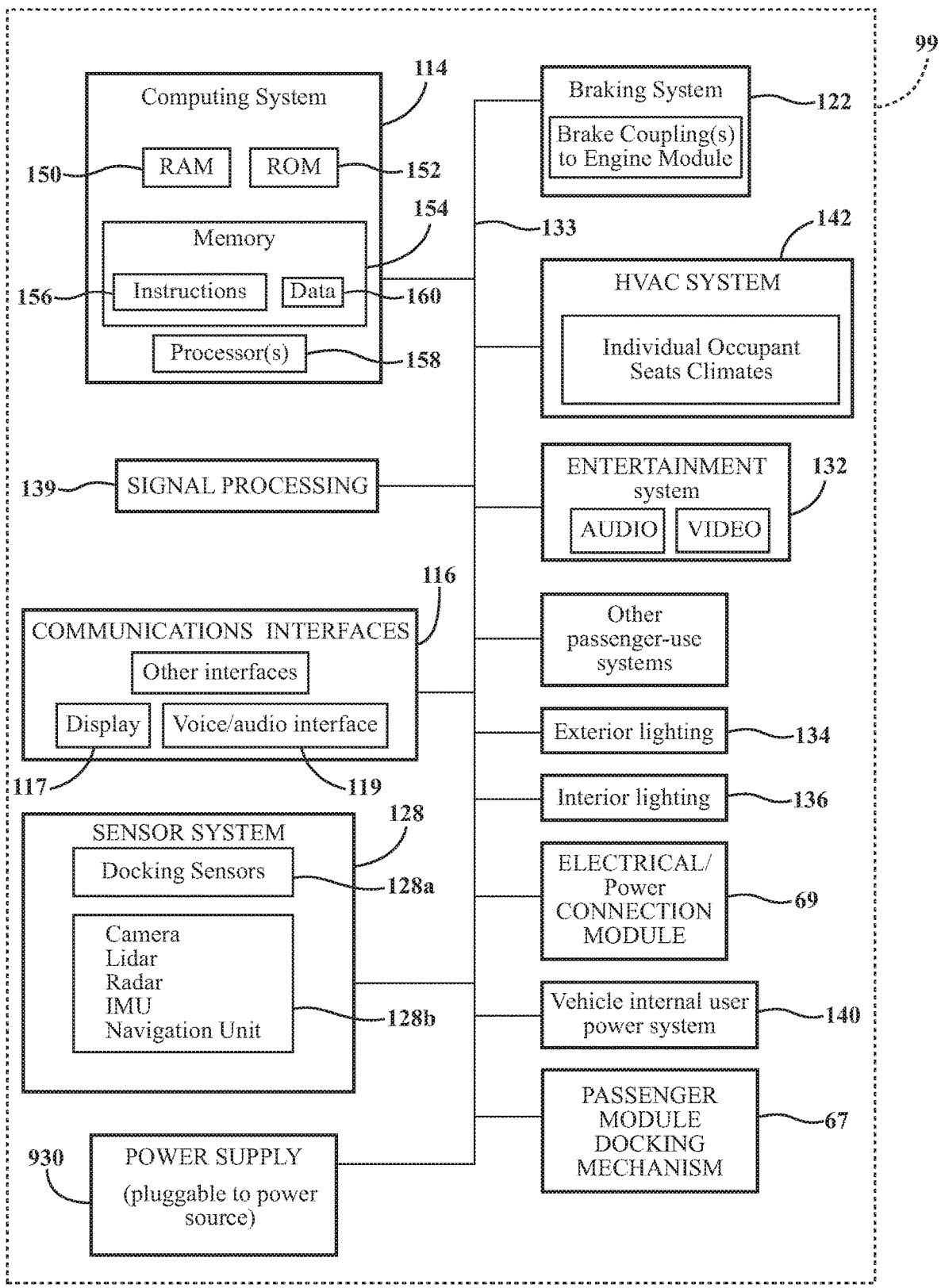
FIG. 3 is a functional block diagram illustrating a passenger module in accordance with an example embodiment.

FIG. 3 is a functional block diagram illustrating a passenger module 99 in accordance with an example embodiment. The passenger module 99 is configured to be dockable with any of a plurality of engine modules, according to the requirements of a particular driving situation as described herein. The passenger module may be customized, personalized, and otherwise configured by a user or owner according to personal preferences. In addition, user-accessible cargo space (for example, trunk or other space) may be increased. Also, because the passenger module 99 is propelled in a driverless mode, the module may be loaded with only cargo and transported to a desired destination. In at least some embodiments described herein, the passenger module may have no engine, motor, or other means of self-propulsion, since these embodiments of the passenger module are designed to use a connected autonomous engine module as the means of propulsion.

The passenger module 99 may include various systems, subsystems and components in operative communication with each other, such as a sensor system or array 128, a computing system 114, one or more communications interfaces 116, a braking system 122, a power supply 930, and other systems and components needed for operating the passenger module 99 as described herein. In the example shown in FIG. 3, the passenger module 99 also includes a heating, ventilation and air conditioning (HVAC) system 142, an entertainment system 132, an exterior lighting system 134, an interior lighting system 136, and may also include other systems (not shown). The entertainment system 132 may include any audio and/or visual devices (for example, DVD players, radios, associated speaker systems,) usable for entertainment by the passenger module occupants. The passenger module internal user power system 140 includes elements such as the cigarette lighter, A/C power outlets, USB ports, and similar features.

Each of the subsystems and elements of passenger module 99 may be interconnected. Thus, one or more of the described functions of the passenger module 99 may be divided up into additional functional or physical components or combined into fewer functional or physical components. In some further examples, additional functional and physical components may be added to the examples illustrated by FIG. 3.

Passenger module sensors system 128 may include any sensors required to support any autonomous driving operations and/or other driving-related activities of an engine module attached to the passenger module 99. Various examples of different types of sensors are described herein. However, it will be understood that the embodiments are not limited to the particular sensors described. In arrangements in which the sensor system 128 includes a plurality of sensors, the sensors can work independently from each other. Alternatively, two or more of the sensors can work in combination with each other. In a known manner, the passenger module sensor system 128 may provide data usable by the passenger module computing system 114 in formulating and executing suitable control commands for the various passenger module systems.

The sensor system 128 may include a number of sensors configured to sense information about the internal and external environments of the passenger module 99. The sensor system 128 may include docking sensors 128a and other sensors 128b, such as a navigation unit (for example, a Global Positioning System (GPS), a RADAR unit, a laser rangefinder/LIDAR unit, an IMU, and one or more cameras comprising devices configured to capture a plurality of images of the interior of the passenger module 99 and/or an external environment of the module. The camera(s) may be still cameras or video cameras. The navigation unit may be any sensor configured to estimate a geographic location of the passenger module 99. To this end, the navigation unit may include a one or more transceivers, including a transceiver operable to provide information regarding the geographical location of the passenger module 99. The passenger module may also incorporate other sensors, if desired.

The passenger module sensor system 128 and computing system 114 may be configured for communicative coupling with the sensor system and computing system of an engine module to which the passenger module is attached (for example, sensor system 28 and computing system 14 of FIG. 2, previously described). This enables the passenger module sensors to serve as extensions of the engine module sensors (for example, in detecting vehicles of other objects behind the passenger module during travel). Certain other elements on the passenger module (for example, exterior lighting and signals and certain sensors) may also be operatively coupled to an engine module computing system 14 during travel, so that these elements may be controlled by the computing system 14. Sensors of sensor system 128 may also monitor the temperature, humidity, ambient light levels and other characteristics of the module interior, for use in controlling module environmental conditions.

The passenger module 99 may include a suitable signal processing means 139 for situations where a sensor output signal or other signal requires pre-processing prior to use by the computing system 114 or another vehicle system or element, or where a control signal sent from the computing system will require processing prior to use by actuatable sub-systems or sub-system components (for example, components of the HVAC system). The signal processing means may be an analog-to-digital (A/D) converter or digital-to-analog (D/A) converter, for example.

The computing system 114 may be operatively connected to the other passenger module systems and elements and otherwise configured so as to affect control and operation of the passenger module 99 and its components as described herein. The computing system 114 may be configured to control at least some systems and/or components autonomously (without user input) and/or semi-autonomously (with some degree of user input). The computing system 114 may also be configured to control and/or execute certain functions autonomously and/or semi-autonomously. The computing system 114 may additionally or alternatively include components other than those shown and described.

FIG. 3 also illustrates a block diagram of an exemplary passenger module computing system 114 according to one or more illustrative embodiments of the disclosure. The computing system 114 may have some or all of the elements shown in FIG. 3. In addition, the computing system 114 may also include additional components as needed or desired for particular applications. The computing system 114 may include one or more processors 158 (which could include at least one microprocessor) for controlling overall operation of the computing system 114 and associated components, and which executes instructions stored in a non-transitory computer readable medium, such as the memory 154. In arrangements in which there is a plurality of processors 158, such processors can work independently from each other or one or more processors can work in combination with each other.

In some embodiments, the computing system 114 may include RAM 150, ROM 152, and/or any other suitable form of computer-readable memory. The memory 154 may comprise one or more computer-readable memories. A computer-readable storage or memory 154 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory or memories 154 can be a component of the computing system 114, or the memory or memories can be operatively connected to the computing system 114 for use thereby.

The memory 154 may contain data 160 and/or instructions 156 (e.g., program logic) executable by the processor(s) 158 to execute various functions of the passenger module 99, including those described above in connection with FIG. 3. The memory 154 may contain additional instructions as well, including instructions to transmit data to, receive data from, interact with, or control one or more of the passenger module systems and/or components described herein (for example, entertainment system 132 and HVAC system 142, sensor system 128, computing system 114, and the communication interfaces 116). In addition to the instructions 156, the memory 154 may store data such as roadway maps, path information, among other information. Such information may be used by the computer system 114 at during travel.

In one or more arrangements, the computing system 114 described herein can incorporate artificial or computational intelligence elements, e.g., neural network, fuzzy logic or other machine learning algorithms. Further, in one or more arrangements, the hardware and/or software elements configured for performing particular functions or operations described herein may be distributed among a plurality of elements and/or locations. In addition to computing system 114, the passenger module 99 may incorporate additional computing systems and/or devices (not shown) to augment or support the control functions performed by computing system 114, or for other purposes.

Communications interfaces 116 may be configured to allow interaction between the passenger module 99 and engine modules, other passenger modules, other computer systems, various external messaging and communications systems (such as a satellite system or cellular phone/wireless communication system) and/or a user. The communications interfaces 116 may include a user interface for providing information to or receiving input from a user of the passenger module 99. For example, the communications interfaces 116 may include a voice/audio interface 119 (for example, a microphone and speaker for providing audio input and output), keypad, touch screen, and/or stylus through which a user of the computing system 114 may provide input, and may also include and a video display device 117 for providing textual, audiovisual and/or graphical output from the computing system 114. The computing system 114 may be configured to interpret or process any received audio input as a response to a query or an instruction for the computing system. The user interface may control or enable control of content and the layout of interactive images that may be displayed on the display. A display in the form of a touch screen may provide information to a user of the passenger module 99. The user interface could also be operable to accept input from the user via the touch screen. The display can be any other suitable type of display. For instance, the display can be a liquid crystal display (LCD), a light emitting diode (LED) display or some other suitable display. In one or more arrangements, the display can be a heads-up display, a display for a navigation system, and/or a display included in an instrument cluster. The display(s) can be provided in any suitable location within the passenger module 99.

Computing system 114 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown). Any other computing systems or devices in the passenger module and any related terminals or devices in operative communication with computing system 114 may include devices installed in vehicles, mobile devices that may travel within vehicles, or devices outside of vehicles that are configured to communicate with passenger module 99. Thus, any terminals or devices in communication with the computing system 114 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband and the like)(not shown), and may include some or all of the elements described above with respect to the computing system 114. In addition, any of these device embodiments may include a haptic interface or may be configured to provide haptic feedback to a passenger module occupant to inform the occupant of any information or condition which should be communicated to the occupant.

The communications interfaces 116 may also include interfaces enabling communication in a wide area network (WAN), a wireless telecommunications network, and/or any other communications networks. The communication network(s) can include any combination of the above networks and/or other types of networks. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and the passenger module 99 and any nearby roadside communications nodes and/or infrastructure. When used in a WAN networking environment, the computing system 114 may include (or be operatively connected to) a modem or other means for establishing communications over the WAN, such as network (e.g., the Internet). When used in a wireless telecommunications network, the computing system 114 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information from external various sources.

The passenger module 99 may include various actuatable sub-systems and elements in operative communication with computing system 114 and other passenger module systems and/or components, and which are operable (at least to some degree) responsive to control commands received from the computing system. Various actuatable sub-systems and elements may be controlled manually or automatically (by computing system 114).

The braking system 122 could include any combination of elements and/or mechanisms configured to decelerate the passenger module 99. The braking system 122 could use friction to slow the wheels. In other embodiments, the braking system 122 may convert the kinetic energy of the wheels to electric current. The braking system 122 may take other forms as well. A particular vehicle may incorporate additional actuatable systems. The braking system may include couplings (for example, suitable electrical and/or hydraulic couplings) enabling connection to the engine module braking system and computer system 14, to enable control of the passenger module brakes by the engine module computing system 14.

The passenger module power supply 930 may provide power to various components of the passenger module 99 and could represent, for example, a rechargeable lithium-ion or lead-acid battery. In some embodiments, one or more banks of such batteries could be configured to provide electrical power. Other power supply materials and configurations are possible. In certain embodiments, the passenger module 99 may include any transformers or power conversion circuitry needed to enable the power supply 930 and/or the passenger module systems to be plugged into a standard A/C outlet, in a garage, for example. This enables the passenger module systems to be utilized even when an engine module is not connected to the passenger module 99.

In some embodiments, the passenger module 99 may incorporate an induction coil and associated circuitry for an induction charging system, or another wireless charging or powering system.

The passenger module 99 may be configured so that the computing system 114, sensor system 128, actuatable sub-systems and other systems and elements thereof can communicate with each other using a controller area network (CAN) bus 133 or the like. Via the CAN bus and/or other wired or wireless mechanisms, the computing system 114 may transmit messages to (and/or receive messages from) the various passenger module systems and components. Alternatively, any of the elements and/or systems described herein may be directly connected to each other without the use of a bus. Also, connections between the elements and/or systems described herein may be through a physical medium (such as wired connections) or the connections may be wireless connections.

Although FIG. 3 shows various components of passenger module 99, computing system 114, memory 154, and communications interfaces 116, as being integrated into the passenger module, one or more of these components could be mounted or associated separately from the passenger module 99. For example, processors 158 or memory 154 could, in part or in full, exist separate from the passenger module 99. Thus, the passenger module 99 could be provided in the form of device elements that may be located separately or together. The device elements that make up passenger module 99 could be communicatively coupled together in a wired or wireless fashion.

Figure 10:
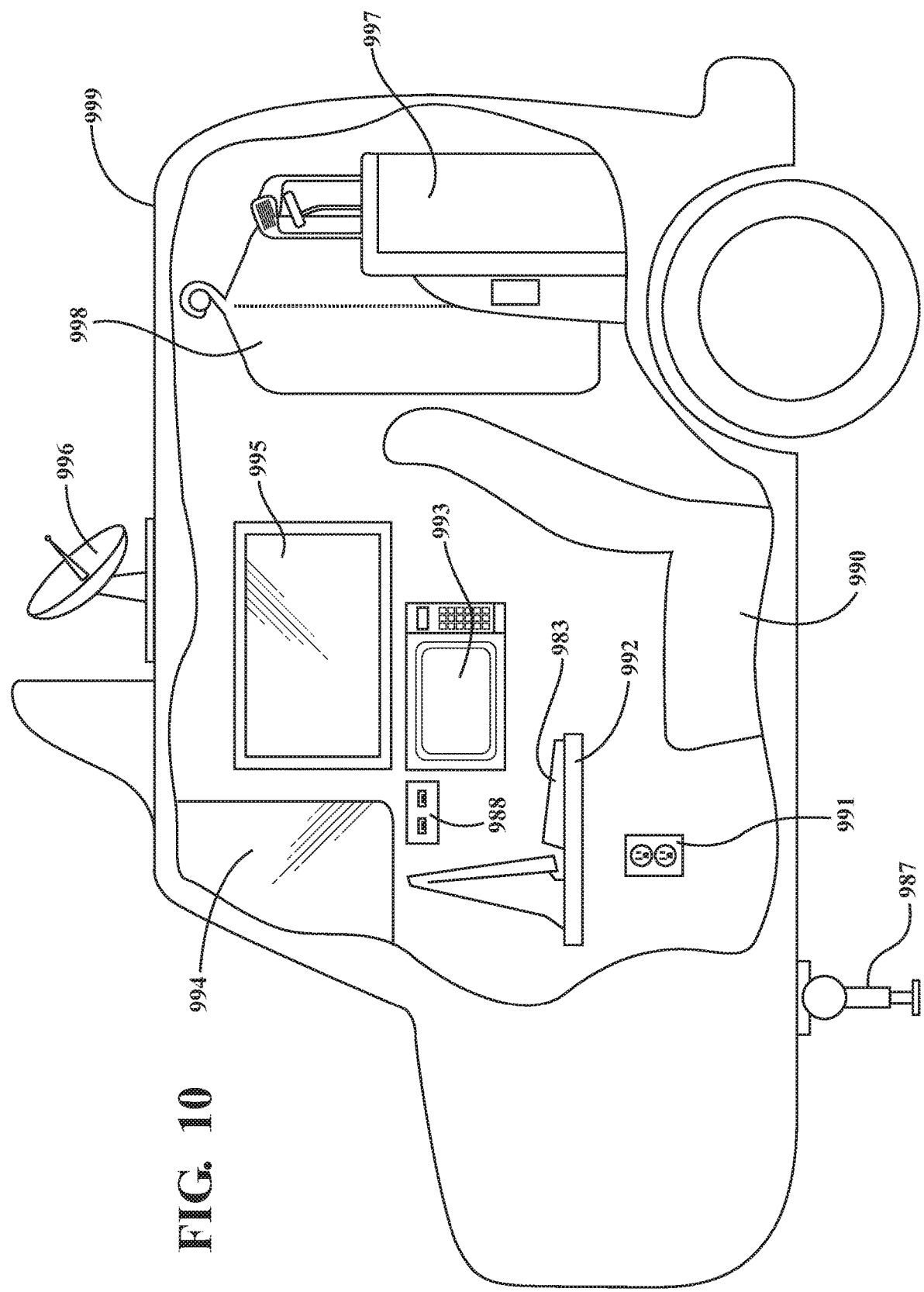
FIG. 10 is a schematic view showing how a passenger module in accordance with an embodiment described herein may be customized or personalized according to the needs of an individual user.

FIG. 10 illustrates one example of how an embodiment 999 of a passenger module may be customized or personalized to meet the needs of a particular user. The user may store items in the passenger module for various purposes. Some items may be stored in the main passenger compartment, while other items are stored in a trunk (not shown) provided in the passenger module. The passenger module may be personalized to accommodate and support various social, sports, and business activities of the individual user. For example, items such as golf clubs, gym bags, tennis rackets, clothing items, etc., may be stored in either a trunk or in the main passenger compartment of the passenger module. The passenger module embodiment shown in FIG. 10 includes such items as a microwave oven 993; a work surface 992 and computer 983 for use by a seated occupant during autonomous travel; golf clubs 997; an entertainment system 995; a wardrobe or clothing stowage 998; and a satellite dish 996. The module 999 may also include such features as A/C outlets 991 and media connections 988 (such as USB and audio connections) found in conventional vehicles. Any of a variety of other amenities may be incorporated into a given passenger module during fabrication or added by an owner of the module. In the module 999, a passenger may during a single trip, for example, watch a movie or video, work on the computer, and prepare a snack in the microwave oven while traveling from an office or home to a golf course for a golf game. The passenger module may be personalized to incorporate everything that a user may need for an entire week (or longer) of scheduled activities, thereby reducing the chances that a needed item may be forgotten by a busy or hurried user. A front portion of the passenger module 999 may be supported by one or more retractable legs 987 operable in the manner similar to leg(s) 499*a* of FIG. 12 (described in greater detail below). Alternatively, the front portion of the module 999 may be supported in a different manner.

Referring to FIGS. 2-4C, an electrical/power connection module 49 may be provided on the engine module 11 for operatively connecting to a similar electrical/power connection module 69 located on the passenger module 99. The modules 49 and 69 may include standardized complementary connectors and/or plug-in connections which facilitate quick coupling of the passenger module electrical systems to the engine module 11, for purposes of powering the various passenger module systems during the period when the engine module 11 is connected to the passenger module 99. The housings of the modules and the structures of the connections may be configured to facilitate automated docking of the engine module to the passenger module, automated separation of the engine module from the docking module, and quick-connection and disconnection of the engine module electrical systems from the passenger module systems. The electrical/power connections may be standardized to enable any engine module to be connected to any passenger module.

Embodiments of the engine module 11 may also include a docking mechanism 51 for operatively connecting to a similar docking mechanism 67 located on the passenger module 99. The docking mechanisms 51, 67 may be structured to mechanically couple the engine module 11 to the passenger module 99, to enable the engine module to pull or otherwise move or propel the passenger module 99 during travel for the uses and purposes described herein. One embodiment of a docking mechanism is shown in FIGS. 4A-4C. This embodiment may be implemented for a front-wheel drive engine module. However, any alternative docking mechanism and procedure suitable for the purposes described herein may be used.

In a particular embodiment (as shown in FIGS. 4A-4C), the engine module docking mechanism 51 and electrical/power connection module 49 may be co-located, and the passenger module docking mechanism 67 and electrical/power connection module 69 may be co-located. This may enable the electrical and mechanical connections between the engine module and the passenger module to be effected at the same time. A front portion of the passenger module 99 may be supported by one or more retractable legs 97 operable in the manner similar to leg(s) 499a of FIG. 12 (described in greater detail below). Alternatively, the front portion of the module 99 may be supported in a different manner.

To operatively connect the engine and passenger modules 11 and 99 with each other, in FIG. 4A, an engine module 11 moves along a road surface R1 in a rearward direction (direction "N" in FIGS. 4A-4C) of the engine module toward the passenger module 99. The engine module may include a wheel 11a positioned above the road surface so as to engage a first rolling surface 99a formed on the passenger module 99. Referring to FIG. 4B, as the engine module 11 continues to move toward the passenger module, wheel 11a contacts first rolling surface 99a and begins to roll upwardly toward a second rolling surface 99b. As the wheel 11a rolls up the surface 99a, the engine module rotates about front wheels 11b, thereby lifting engine module rear wheels 11c off of the road surface R1. Lifting the rear wheels 11c of the engine module off the ground enables the engine module/passenger module combination to be steered using the engine module front wheels 11b. At the same time, rotation of the engine module body causes the engine module electrical/power connection module 49 and docking mechanism 51 to align with the complementary passenger module electrical/power connection module 69 and docking mechanism 67 on the passenger module.

Referring to FIG. 4C, as wheel 11a reaches second rolling surface 99b and continues to roll along this surface, the engine module electrical/power connection module 49 completes docking with (and electrical coupling with) the passenger module electrical/power connection module 69. Also, the engine module docking mechanism 51 completes docking to the passenger module docking mechanism 67. The passenger module is now electrically and mechanically connected to the engine module for purposes of propelling the passenger module to its intended destination and/or for its intended purpose. The operatively connected modules 11 and 99 combine to form an autonomous passenger vehicle. The docking procedure may be automatically controlled by the engine module computing system 14, using an automated docking capability 73 and module docking sensors 28a, 128a (if needed) in operative communication with the computing system.

In one example, the automated docking capability may be implemented by utilizing machine-detectable visual markers such as AprilTags or similar markers. Such markers may aid autonomous orientation and positioning of the engine module with respect to the passenger module. Docking sensors 128a may include lasers and/or sonar to help calculate and monitor the distances between the engine and passenger modules during docking.

While FIGS. 4A-4C show a single, centrally-positioned docking assistance wheel 11a located on the engine module 11, other wheel configurations are also possible. For example, a pair or wheels (not shown) may be used, with one wheel positioned on each side of the engine module 11 for engaging corresponding docking surfaces similarly positioned along sides of the passenger module 99.

In a particular embodiment, the docking mechanism includes at least a pair of docking ears extending from one of the engine module and the passenger module, and at least a pair of associated cavities formed in the other one of the engine module and the passenger module. Each cavity is structured to receive therein an associated docking ear during docking of the autonomous engine module with the passenger module. In the embodiment shown in FIGS. 4A-4C, a pair of docking ears 51a is located on engine module 11 and cavities 67a for receiving the docking ears are located on the passenger module 99. Although the embodiment shown uses a single pair of docking ears (one along each of the left and right sides of the engine module), any number of docking ears and associated cavities may be used. A securement mechanism (generally designated 79) may be provided in one of the engine module and the passenger module for securing the docking ears in their associated cavities when the modules are docked and during operation of the autonomous passenger vehicle, thereby maintaining the autonomous engine module in a docked condition with the passenger module during travel of the engine module and the passenger module when passenger module is operatively connected to the engine module. The securement mechanism 79 may be in the form of a suitable pin or latch mechanism which is actuatable automatically by the engine module computing device when docking sensors 28a and/or 128a determine that the modules are docked. Alternatively, any of a variety of other docking mechanisms may be used.

Detachment of the engine module 11 from the passenger module may follow a reverse procedure. The securement mechanism 79 may be disengaged to permit the docking ears 51a to be removed from their associated cavities 67a. The engine module 11 may then move slowly in a forward direction of the module (direction "M") disengaging the electrical connection modules and docking mechanisms as the wheel 11a rolls along passenger module surface 99b. As the engine module moves forward, wheel 11a rolls down surface 99a until the engine module rear wheels are grounded.

Figure 11:
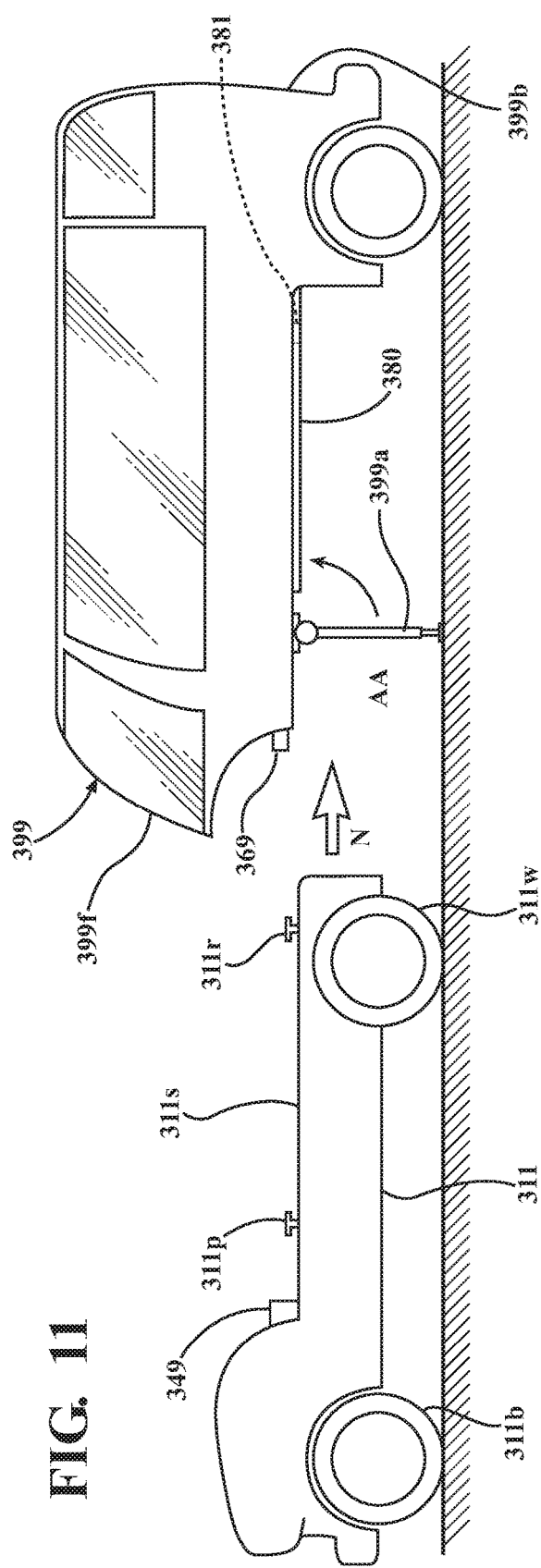
FIGS. 11 and 11A show an alternative embodiment of a docking mechanism for connecting and engine module with a passenger module.
Figure 11A:
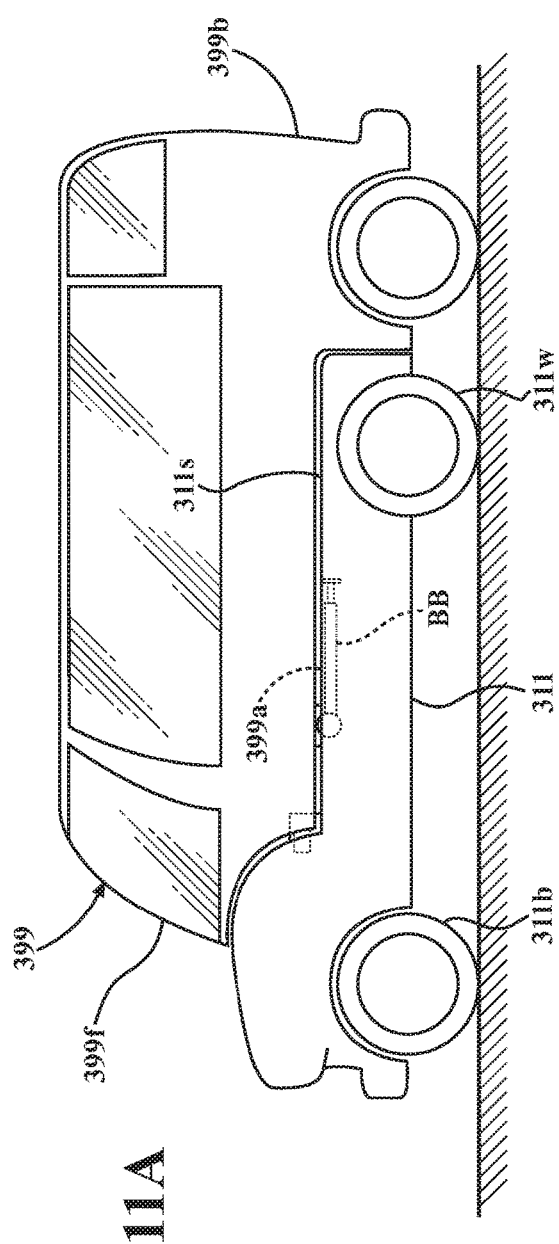

FIGS. 11 and 11A show an alternative embodiment of a docking mechanism. In the embodiment shown in FIGS. 11 and 11A, prior to docking, a front portion of passenger module 399 is supported by one or more retractable legs 399a. In one example, a pair of legs 399a is spaced apart along a lateral or width dimension of the passenger module 399, on an underside of the module. Legs 399a are structured to support a front end 399f of the passenger module 399 when the passenger module 399 is not docked with an engine module. The legs 399a may be structured to be retractable (for example, by rotation from the deployed support positions "AA" shown in FIG. 11 to stowed or retracted positions "BB" (FIG. 11A)) when the passenger module front end 399f is supported by an attached engine module 311 after docking.

In the embodiment shown in FIG. 11, a pair of posts 311p and 311r may be provided along an upper surface 311s of the engine module 311. A channel or rail 380 may be attached to an underside of the passenger module 399. The channel 380 may be structured to receive posts 311p and 311r therein as the engine module 311 travels in direction "N" to dock with the passenger module 399. During docking, to align the posts 311p and 311r with the passenger module channel 380 for docking, sensors (for example, cameras, lidar, ultrasonic ranging and/or other sensors) on the engine module 311 may register on APRILtags or other identifier(s) located on the passenger module 399. The computing system of the engine module 311 may be configured to control the engine module to adjust the position and/or heading of the engine module to facilitate alignment. When the engine module 311 is aligned with the passenger module 399 for docking, the engine module 311 may back into engagement with the passenger module 399, forcing posts 311p and 311r into the passenger module channel 380.

As the engine module moves in direction "N", posts 311p and 311r move along the passenger module channel 380 until the rear post 311r reaches a predetermined position, at which point a locking mechanism 381 engages the rear post 311r to lock the rear post in the predetermined position. The engine module is now docked with the passenger module as shown in FIG. 11A. Connection of the electrical systems of the engine and passenger modules may be performed as described with respect to FIGS. 4A-4C. In the embodiment shown in FIG. 11, element 349 may be an engine module electrical/power connection module similar to module 49 of FIGS. 4A-4C, and element 369 may be a passenger module electrical/power connection module similar to module 69.

The locking mechanism 381 may automatically engage the rear post 311r when the post reaches the predetermined position during docking. Alternatively, the passenger module 399 may incorporate one or more sensors (not shown) configured to detect when the rear post 311r is in the predetermined position. The sensors may be coupled to the passenger module computing system. The computing system of passenger module 399 may be configured to, responsive to input from the sensors, actuate the locking mechanism 381 to lock the rear post 311r in position relative to the passenger module. Alternatively, the locking mechanism may be actuated manually. The locking mechanism 381 maintains the passenger module 399 in a docked condition with the engine module 311 during operation of the autonomous passenger vehicle formed by docking the engine module with the passenger module, and until the locking mechanism 381 is disengaged. Any type of locking mechanism suitable for the purposes described herein may be used.

The computing system of engine module 311 may be configured to control the suspension of the engine module front wheels 311b and rear wheels 311c so as to slightly raise the engine module after the rear post 311r engages the locking mechanism 381 on the passenger module 399, thereby relieving pressure on the legs 399a. Relieved of supporting the weight of the passenger module front end 399f, the legs 399a may be retracted into positions "BB". A computing system in either the engine module 311 or the passenger module 399 may be configured to operate the legs 399a so as to retract the legs after the passenger module weight has been transferred from the legs 399a to the engine module 311, and also configured to extend the legs 399a to their support positions prior to withdrawal of the posts 311p and 311r from the passenger module channel 380. Alternatively, movement of the legs 399a between the support and retracted positions may be done manually. For example, a computing system in either the engine module 311 or the passenger module 399 may be configured to provide a signal indicating that the front portion of the passenger module is being supported by the engine module 311. Upon receipt of this signal, the user may manually retract the legs 399a. After the legs 399a have been retracted, the engine module suspension may be operated to return the engine module 311 to its normal operating height.

To disengage the engine module 311 from the passenger module 399, the procedure described above may be reversed. The engine module suspension may be controlled to raise the engine module 311 and the front portion 399f of the passenger module where the legs 399a are located. The legs 399a may then be lowered to support the front portion 399f of the passenger module 399. The engine module suspension may then be operated to return the engine module 311 to its normal operating height, after which the locking mechanism 381 may be disengaged. The engine module may then be moved forwardly (in a direction opposite direction "N") to remove the posts 311p and 311r from the channel and disengage the engine module 311 from the passenger module 399.

Figure 12:
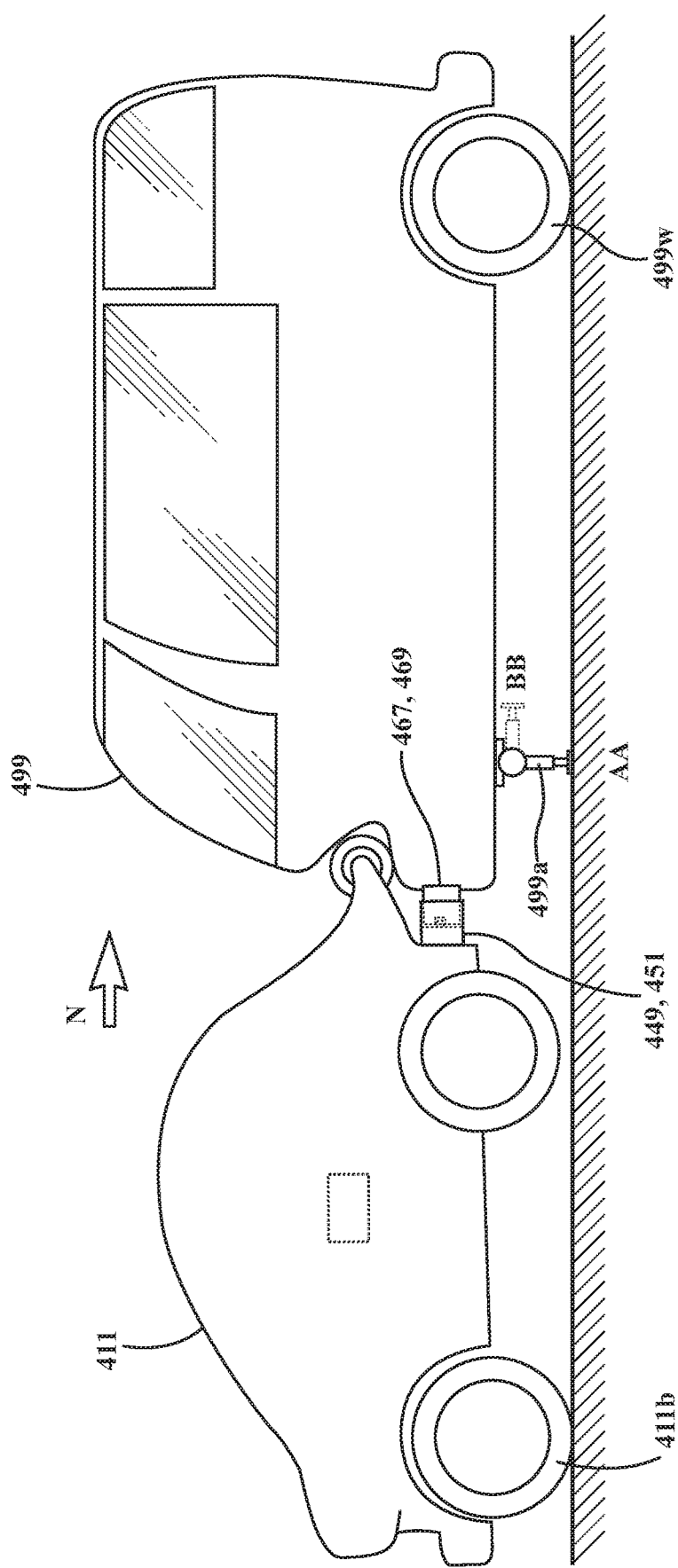
FIG. 12 shows another alternative embodiment of a docking mechanism for connecting and engine module with a passenger module.

FIG. 12 shows another embodiment 499 of a passenger module in a docking arrangement similar to the embodiment shown in FIGS. 4A-4C. In this embodiment, prior to docking, a front portion of passenger module 499 is supported by one or more retractable legs 499a. In one example, a pair of legs 499a is spaced apart along a lateral or width dimension of the passenger module 499, on an underside of the module. Legs 499a are structured to support a front end of the passenger module 499 when the module is not docked with an engine module. The legs 499a may be structured to be retractable (for example, by rotation from the deployed support positions "AA" shown in FIG. 12 to stowed or retracted positions "BB") when the passenger module front end is supported by an attached engine module 411 after docking.

To align the engine module 411 with the passenger module 499 for docking, sensors (for example, cameras, lidar, ultrasonic ranging and/or other sensors) on the engine module 411 may register on APRILtags or other identifier(s) located on the passenger module 499. The engine module computing system may be configured to control the engine module 411 to adjust the position and/or heading of the engine module to facilitate alignment. When the engine module 411 is aligned with the passenger module 499 for docking, the engine module 411 may back (in direction "N")

into engagement with the passenger module 499 as previously described with respect to FIGS. 4A-4C until the modules 411 and 499 are docked. In the embodiment shown in FIG. 12, element 449 may be an engine module electrical/power connection module similar to module 49 of FIGS. 4A-4C, element 469 may be a passenger module electrical/power connection module similar to module 69, element 451 may be a docking mechanism similar to docking mechanism 51, and element 467 may be a docking mechanism similar to docking mechanism 67.

In this embodiment, the docking mechanisms and connections previously described may be strengthened and modified to enable the weight of the autonomous passenger vehicle between the engine module wheels 411*b* and the passenger module wheels 499*w* to be supported during operation of the vehicle. A computing system in either the engine module 411 or the passenger module 499 may be configured to operate the legs 499*a* so as to retract the legs after docking of the engine module 411 with the passenger module 499, and also to extend the legs to their support positions prior to disengagement of the docked engine module from the passenger module as previously described with respect to FIGS. 4A-4C. Alternatively, movement of the legs 499*a* between the support and retracted positions may be done manually. For example, a computing system in either the engine module 411 or the passenger module 499 may be configured to provide a docking confirmation signal detectable by a user. Upon receipt of this signal, the user may manually retract the legs 499*a*. In addition to those described above, any of a variety of other docking mechanisms and arrangements may be utilized.

Figure 5:
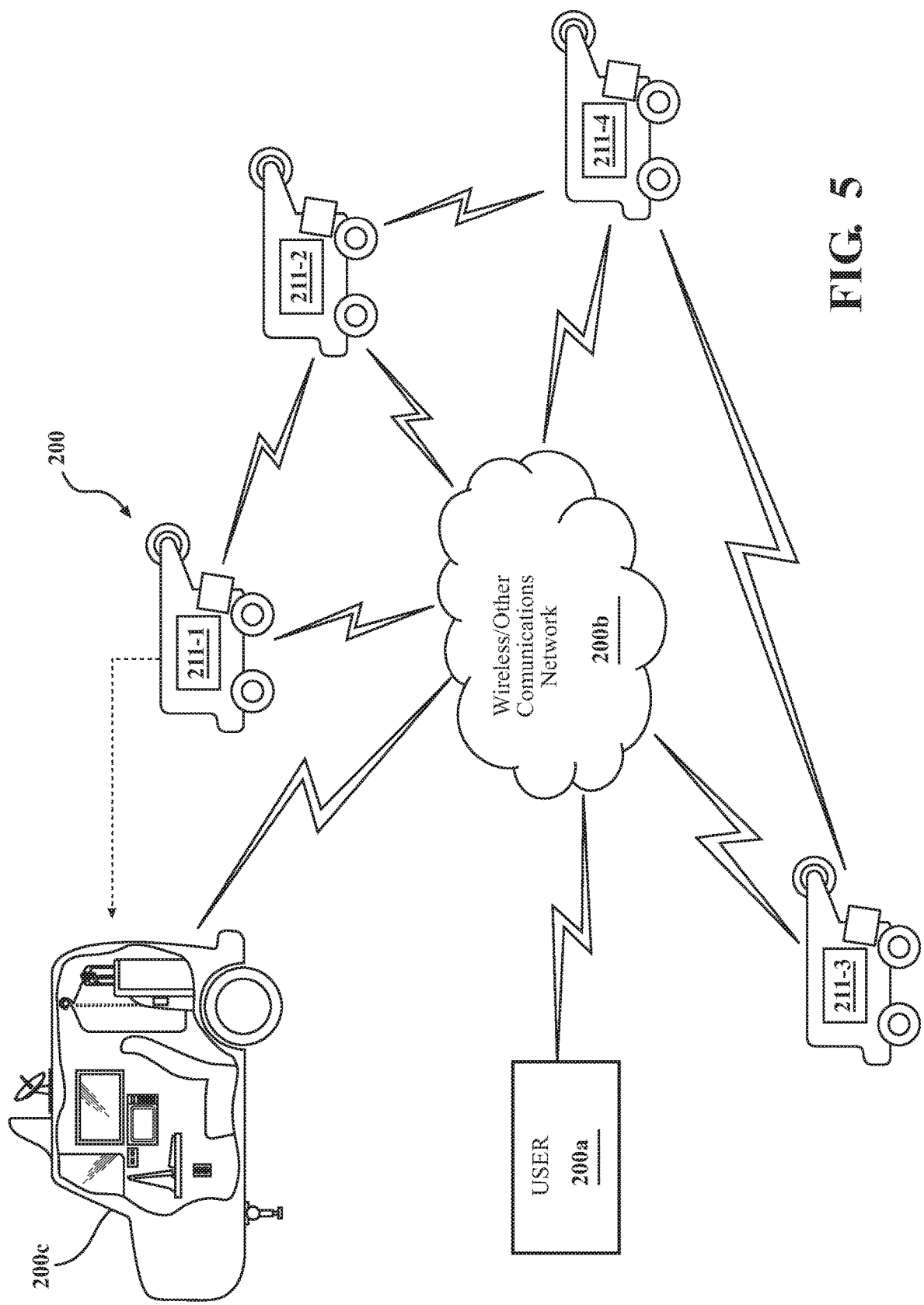
FIG. 5 is a schematic block diagram of a transportation system in accordance with one embodiment described herein.
Figure 6:
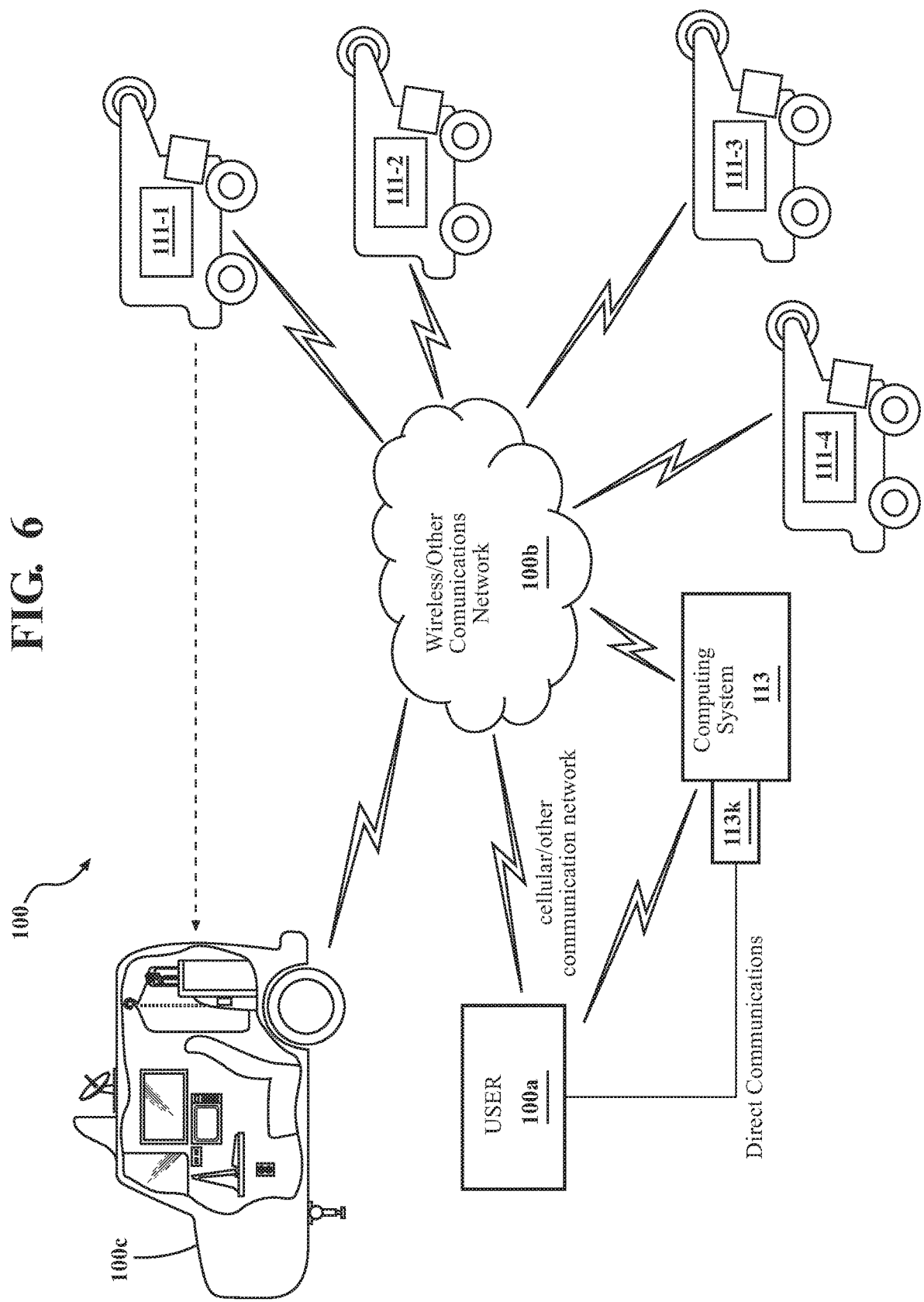
FIG. 6 is a schematic block diagram of a transportation system in accordance with another embodiment described herein.

Referring to FIGS. 5 and 6, embodiments of the engine module 11, the passenger module 99, and the computing systems described herein may be incorporated into various embodiments of a transportation system. A computing system as described herein for determining suitable autonomous engine module use candidates and for performing related functions may be embodied in one or more computing devices external to any of the engine modules and/or passenger modules described herein. FIG. 6 shows an example of a transportation system 100 incorporating such an embodiment. In this embodiment, the transportation system 100 includes at least one passenger module 100*c* and a plurality of engine modules 111-1, 111-2, 111-3, and 111-4. Each engine module may be configured to operatively couple with the passenger module to form an autonomous passenger vehicle. This embodiment also includes a computing system 113 separate from the engine modules and configured as shown in FIG. 1, to implement the engine module use candidate determination capability and make engine module use candidate determinations. For example, the computing system 113 may be a central computer located at a roadside facility. Communications between a user 100*a*, the passenger module 100*c*, the computing system 113, and the engine modules may be enabled by a wireless or other communications network 100*b* through which elements of the transportation system 100 can communicate with the communications interfaces in the engine modules and communications interfaces 113*k* coupled to the computing system 113. The user 100*a* may communicate with the computing system 113 directly (for example, via a wired connection) or wirelessly via the communications network.

Alternatively, the computing system may, for example, be embodied in a decentralized computing system embodied in a plurality of autonomous engine modules of a transportation system, as described herein. A transportation system embodiment 200 incorporating such a computing system is shown in FIG. 5. This embodiment includes at least one passenger module 200*c* and a plurality of engine modules 211-1, 211-2, 211-3, and 211-4. Each engine module may be configured to operatively couple with the passenger module 200*c* to form an autonomous passenger vehicle. In this embodiment, the computing system performing the module use candidate determination is embodied in the collection of engine modules. Each engine module may be configured as previously described with respect to FIG. 2, including a version of the engine module use candidate determination capability 71 described herein. Each engine module computing system may perform the necessary evaluations and determinations on itself (i.e., each engine module is "self-evaluating"), to determine its suitability for the intended use. In addition, the engine modules are configured to communicate with each other either directly or via a wireless or other communications network 200*b*. The user 200*a* may communicate with any or all of the engine modules via the communications network through the communications interfaces in the engine modules.

As previously described, various computing system embodiments (such as computing system 13 in FIG. 1 and engine module computing system 14 of FIG. 2) may be configured to implement an embodiment of an autonomous engine module use candidate determination capability. The use candidate determination capability may be stored in a computer system-accessible memory and implemented in the form of computer-readable program code that, when executed by a processor, implement one or more of the various processes, instructions or functions described herein. By this capability, an embodiment of the computing system may be configured to evaluate autonomous engine module requests received from a user or other entities and to determine, responsive to a request and based on information in the request and other pertinent information (as available) at least one autonomous engine module use candidate from a plurality of autonomous engine modules. The autonomous engine module use candidates may be engine modules which are deemed to best meet the preferences and/or requirements of a particular proposed use. The autonomous engine module candidates may be selected from a pool of autonomous engine modules (for example, the group of engine modules 211-1 through 211-4, plus any other engine modules in the group of FIG. 5) that are maintained and allocated for use in propelling passenger modules that are dockable with the engine modules.

Figure 7:
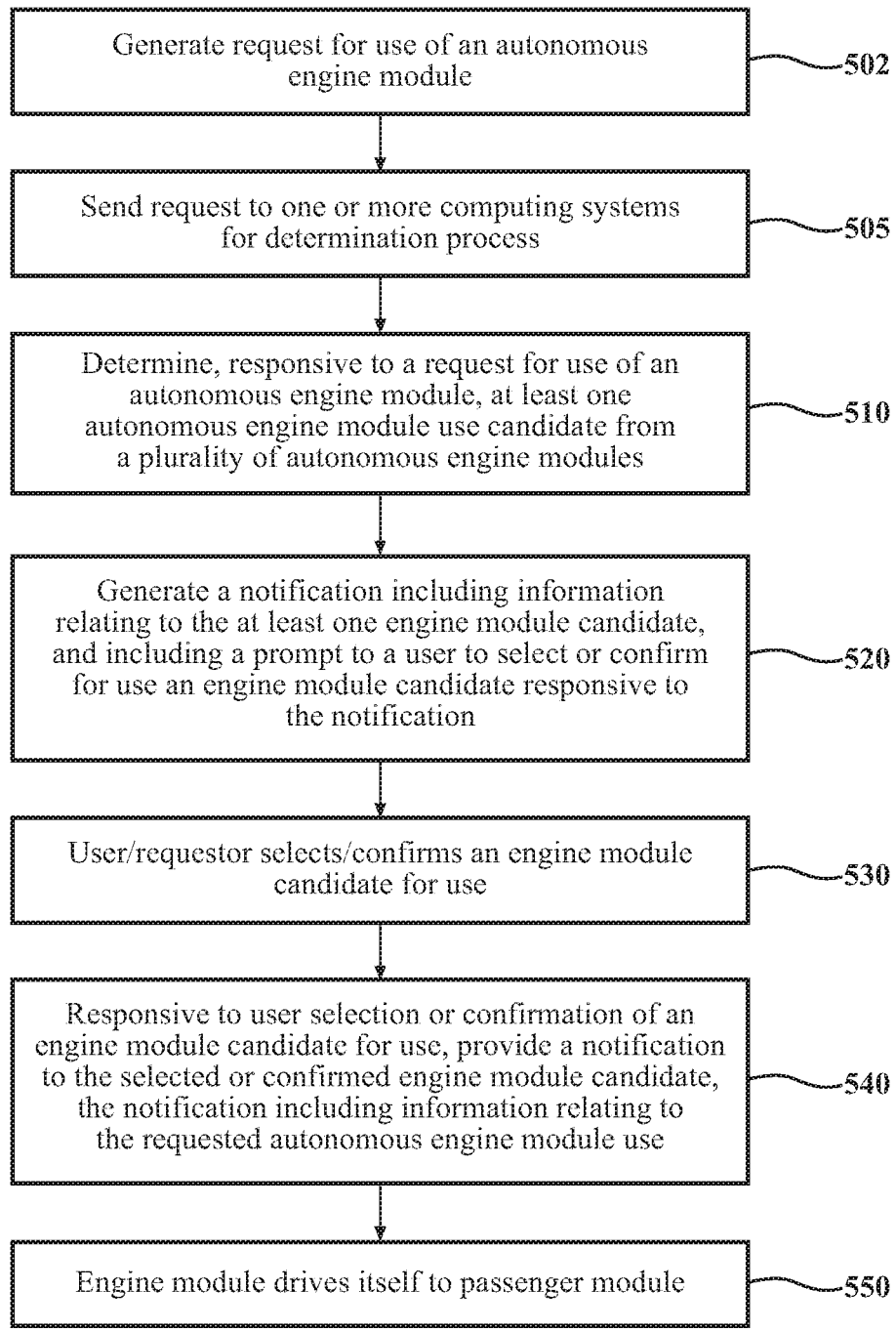
FIG. 7 is a flow diagram illustrating a method of selecting an engine module based on a request for use, and of providing a selected engine module to a user for use at a desired time and place.

FIG. 7 is a flow diagram illustrating a method of selecting an engine module based on a request for use, and of providing a selected engine module to a user for use at a desired time and place. Some of the steps described may be performed by a user or other requesting entity, and some of the steps may be performed by a computing system performing the engine module determination. For example, in the embodiment shown in FIG. 7, blocks 510, 520 and 540 may be performed by a computing system as described herein.

In block 502, a request for engine module use may be generated via a user interface such as, for example, a cellular phone application, an interface located in the passenger module, or from another terminal connected to the Internet. Any suitable interface may be used. A request for use of an autonomous engine module or an "autonomous engine module request" may be any request for use of an autonomous engine module received from a transportation system user, a group of users, an organization, or any other source. The computing system interface or request application may be configured to enable the user to specify one or more user preferences, from a menu, for example. Examples of such preferences may include budgetary requirements, cost limitations, or a request to minimize travel costs; selection of a preferred source or provider for the engine module; trip start location; one or more destinations; an order in which multiple destinations should be traveled to; a type of driving desired (for example, either "relaxed" or "shortest time to destination"); a type of fuel desired (for example, gasoline, diesel, hybrid-electric, electric); whether the engine module is intended to tow an object, such as a trailer; an expected number of passengers; proposed date(s), start time(s), and length(s) of usage; and any other pertinent information.

If desired, a passenger module identifier tag or a passenger module information file may be attached to the request for use. The identifier tag and the information file both contain information relating to the passenger module to which the request for use pertains. The identifier tag may include an alphanumeric designation representing information on passenger module characteristics which may be useful to a computing system in making engine module use candidate determinations. Passenger module information associated with each identifier may be available from a database stored in a memory. The information file may include the passenger module characteristic information. Such information may include, for example, the passenger module weight (empty), overall dimensions, available cargo or storage space (including trunk size), the number of passenger seats, estimated maximum electrical power requirements (for example, if all power outlets and passenger-related systems are running simultaneously); information regarding the sensors present on the passenger module, and any other pertinent information. The generated request may be transmitted (via a suitable communications system) to a computing system for processing.

In block 505, the generated request may (if necessary) be transmitted to one or more computing systems for the module use candidate determination process. For example, if the request was made using an interface in operative communication with a computing system configured to make the use candidate determination, transmission to a computing system may not be necessary. In a transportation system configured as shown in FIG. 5, the request may be received by one or more of the engine modules 211-1 through 211-4. The receiving module(s) may then relay the request to all of the other engine modules in the network, either directly or via communications network 200b. This ensures that each engine module receives the request for individual processing. A protocol may be established for designating one of the engine modules as a "receiving module", for receiving messages from the user/requestor which will be forwarded to other engine modules in case they were not received in the original transmission, and for receiving messages from the other engine modules which are forwarded to the user/requestor. For example, an engine module which is closest geographically to the requesting entity may be designated the receiving module. In a transportation system configured as shown in FIG. 6, the request may be received by the computing system 113 which executes the determination process.

In block 510, a computing system determines, responsive to the request for use of an autonomous engine module, at least one autonomous engine module use candidate from a plurality of autonomous engine modules. In determining the engine module use candidates, the computing system executing the evaluation may be configured to compare parameters of the requested usage with the availabilities and capabilities of each engine module. In evaluating a given engine module for a proposed usage, the engine module features and capabilities may be compared with characteristics of the proposed use, as stated in the request and as determined or assumed by the computing system based on request information and other information.

Engine modules may be eliminated as usage candidates based on failure to satisfy usage requirements or preferences. In addition, some engine modules which are deemed suitable as candidates may be given higher priority as use candidates than other suitable modules, based on their ability to better satisfy usage requirements or preferences. The determination process results in a list of one or more use candidates deemed most suitable for the intended use. Information regarding these candidates is incorporated into a notification generated for presentation to a user.

Determination of at least one autonomous engine module use candidate may include determining what information is included in the autonomous engine module request, and processing of this information using one or more tools stored in memory, such as algorithms, lookup tables, equations, functions, comparisons with predetermined thresholds, and any other suitable tools configured to aid in selecting one or more autonomous engine modules which may satisfy all (or as many as possible) of the requirements and preferences set forth in the request. Based on the descriptions provided herein and on various usage evaluation criteria determined by the engine module and passenger module OEM's, one skilled in the art may provide tools for this purpose using known techniques, for example, by identifying criteria for evaluating information provided in the request, and assigning a priority and/or value to each criterion. Usage request information may also be assigned greater or lesser weights for evaluation purposes depending on, for example, the information content and/or the presence or absence of the information in the request. The information describing the requested usage is then compared with the known characteristics and capabilities of the engine module to determine suitability for the intended usage.

Figure 8:
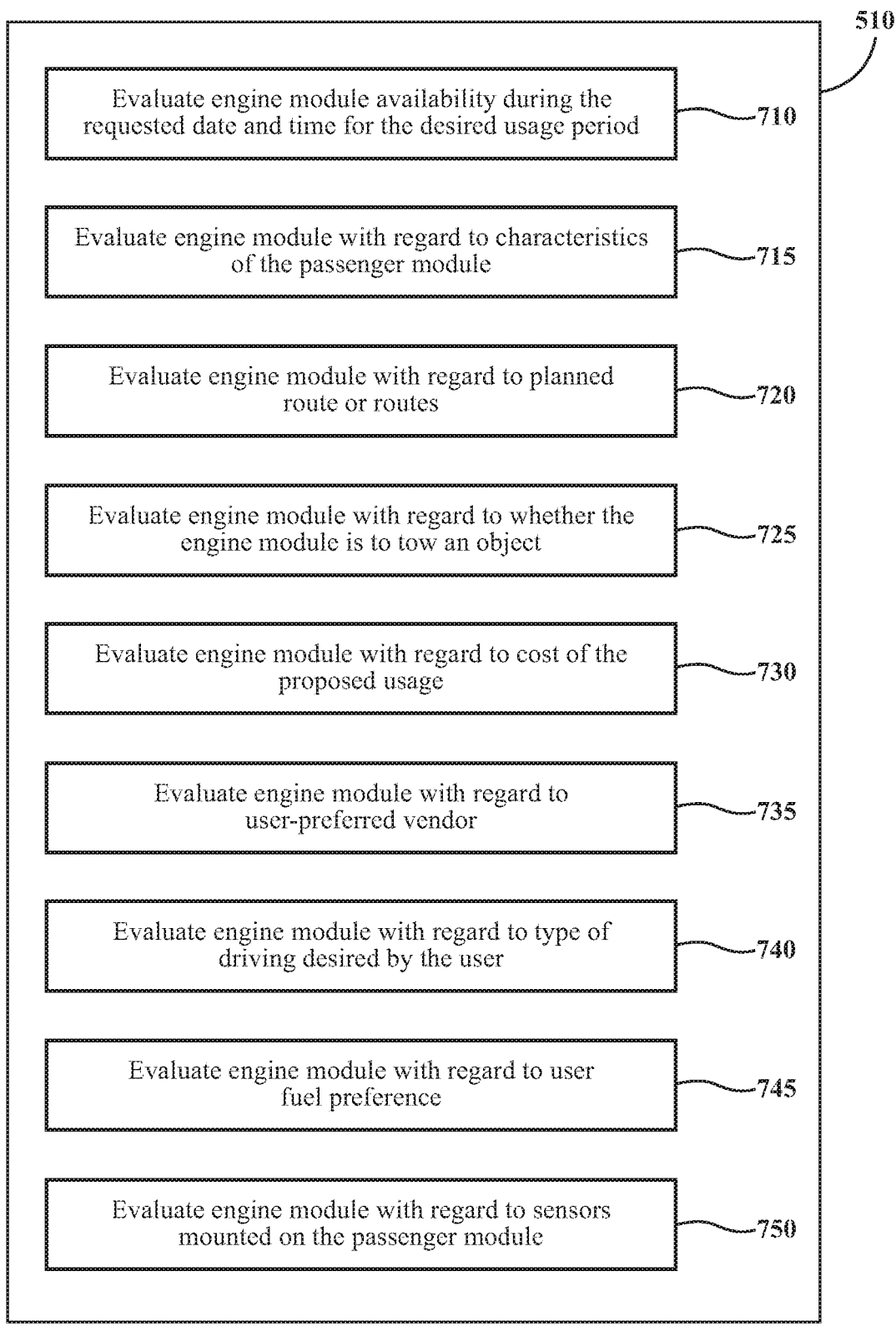
FIG. 8 is a schematic block diagram illustrating examples of engine module evaluation criteria usable for determining at least one autonomous engine module use candidate from a plurality of autonomous engine modules, as described in block 510 of FIG. 7.

FIG. 8 is a schematic block diagram illustrating examples of engine module evaluation criteria usable for determining at least one autonomous engine module use candidate from a plurality of autonomous engine modules as set forth in block 510 of FIG. 7. Other criteria may also be employed. The engine module may be evaluated for suitability for the proposed usage using one or more than one criteria, according to information in the usage request and any other available information. The blocks shown in FIG. 8 need not necessarily be executed in any particular order. In addition, some blocks may not be executed if the information available is insufficient for evaluation. For example, if the usage request does not specify a fuel-type preference or information is not available on passenger module characteristics, the proposed usage may not be evaluated using these criteria, and one or more engine module candidates may be selected based only on whatever information is provided by the user. For example, if a user specifies only a desired date and time of usage, one or more engine module candidates may be determined based solely on engine module availability at the desired date and time. This may enable the user to simplify the engine module determination process. For example, the user may own a simple, standard or relatively lightweight passenger module and may need an available engine module as soon as possible. Cost or other possible evaluation parameters may be relatively unimportant. In this case, simplification of the engine module determination process may increase the number of potential engine module candidates, thereby increasing the likelihood that an engine module will be available on the date and time needed. In a similar manner, the pool of possible engine module candidates may be expanded by specifying as few evaluation parameters as possible. In certain embodiments, some of the evaluation criteria shown in FIG. 8 may be interrelated. For example, the planned route (block 720) may affect the cost of the propose usage (block 730). In such cases, the computing system may be configured to determine a specific order for performance of the blocks and/or to perform the blocks shown in a specific order designed to facilitate the engine module determination.

Criteria for evaluating the suitability of any particular engine module for a given application may include such factors as engine module availability during the requested date and time for the desired usage period, the characteristics of the passenger module (such as passenger module weight and overall dimensions, which sensors are present or absent on the passenger module, and similar factors), the planned route or routes, whether the engine module is to tow an object in addition to propelling the passenger module, and any other pertinent factors. One or more of these criteria may be used as key thresholds for determining the suitability of a particular engine module for a proposed use. That is, if it is considered necessary for an engine module to satisfy one or more of the above thresholds, the module may be eliminated from consideration as a use candidate if it fails to meet the required threshold(s). Other evaluation criteria may include the estimated cost of the proposed usage, whether the user has a preferred vendor or supplier of the engine module, the type of driving desired by the user, user fuel preference (e.g., diesel, hybrid, electric, gasoline), and other factors. In particular embodiments, one or more of these parameters may be specified by a user as previously described. The computing system may be configured to (through its determination procedures and tools) determine an engine module use candidate (or candidates) deemed most suitable for meeting all of the transportation and user requirements for the proposed use, or as many of the requirements as possible.

In block 710, the computing system may_evaluate engine module availability during the requested date and time for the desired usage period may be determined by comparing the proposed usage period with a known schedule of the engine module.

In block 715, the computing system may evaluate the passenger module characteristic information (such as weight, size, etc.) as previously described by reviewing any available passenger module characteristics and determining if the engine module in question may be appropriate for propelling the passenger module as desired and/or required during the proposed usage. This may be done by determining if this information is included in the autonomous engine module use request. For example, for a relatively heavier passenger module, an engine module with a more powerful engine may be appropriate.

In block 720, the computing system may evaluate the suitability of the engine module with regard to a planned route of the vehicle during the proposed usage. The computing system may (in conjunction with a navigation unit or system) determine one or more possible routes based on start and end locations provided by the user. The computing system may be configured to make estimations or determinations (such as traffic densities at locations along the route during the usage time, for example) regarding the route. These estimations may be factored into the use candidate determination. For example, if a planned route involves 90% expressway travel, selection of an engine module having a relatively higher fuel-efficiency may be indicated. In another example, if a planned route or a desired type of driving involves a high percentage (as determined by comparison with a predetermined threshold) of relatively high-speed driving, an engine module having a relatively higher horsepower may be more appropriate.

In block 725, the computing system may evaluate the engine module with regard to whether the engine module is to both propel the passenger module and tow an object behind the passenger module. For example, if the proposed engine module usage involves towing a trailer as well as the passenger module, or the passenger module has a weight above a certain threshold, an engine module capable of generating a relatively higher torque may be needed. If the information is not included in the request, or if the information in the request indicates that no object is to be towed by the passenger module, the computing system may assume that no object is to be towed and determine suitable engine module candidates on that basis.

In block 730, the computing system may evaluate the engine module with regard to the total cost of the proposed usage. The cost of the proposed usage may be estimated and itemized, with reference to available information, such as features of the planned route, the fuel preference, the type of driving desired, the fuel cost per travel mile, and the cost of renting the unit over the proposed usage period. Engine modules offering the lowest total usage cost (within the desired and/or required usage parameters) may be selected by the computing system for presentation to the user.

In block 735, the computing system may evaluate the engine module with regard to whether it is controlled, owned, or leased by a user-preferred vendor. The user's choice of engine module vendor may be considered. The computing system may attempt to identify modules which meet usage requirements and which are available from the requested vendor. If a vendor does not offer (or have available at the requested time) a module with a capability deemed necessary for the proposed use, this may be indicated to the user, along with possible alternative engine modules and vendors.

In block 740, the computing system may evaluate the engine module with regard to a type of driving desired by the user. For example, if the user desires a relaxed or leisurely (i.e., non-hurried) trip, an engine module which may generate less horsepower may be used. Alternatively, if the user desires minimum travel time to a destination, an engine module which may generate more horsepower may be more appropriate.

In block 745, the computing system may evaluate the type of fuel used by the engine module with regard to a user fuel preference (e.g., diesel, hybrid, electric, gasoline).

In block 750, the computing system may evaluate engine module with regard to the number, types and/or locations of sensors mounted on the passenger module. If certain types of sensors are not available on a given passenger module, it may be desirable to specify possible engine modules for selection which incorporate such sensors and/or which have such sensors configured such that the lack of the sensors on the passenger module may be compensated for.

The list of criteria shown in FIG. 8 is not exhaustive, and the engine module may also be evaluated on additional or alternative criteria, if desired.

Figure 9:
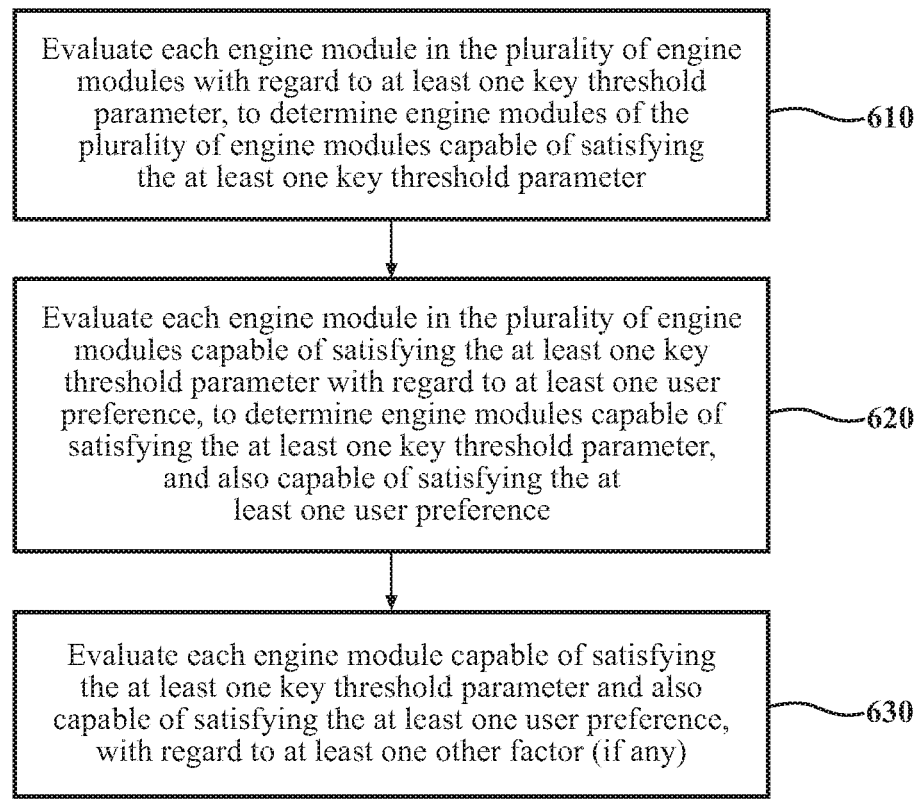
FIG. 9 is a flow diagram illustrating an example of a use candidate determination process which is prioritized and/or weighted, according to pre-programmed instructions or by a user prior to determination of the engine module candidates.

In particular embodiments, the various parameters considered in the use candidate determination may be prioritized and/or weighted, according to pre-programmed instructions or by a user prior to determination of the candidates. A flow diagram illustrating an example of such a process is shown in FIG. 9. In block 610, the requirements of the particular transportation need may be evaluated first or given priority over user preferences (such as cost and fuel-type preference, for example). The inability of some engine modules to meet use requirements may eliminate these modules from consideration as possible use candidates because, for various reasons, they may not be able to satisfy the requested usage. For example, unavailability of an engine module at the requested usage time, or the inability of the engine module to effectively propel the estimated weight of the passenger module or the passenger module and a trailer may eliminate the module from consideration. Thus, at least one of these parameters and other, similar parameters may be examined first, as key threshold parameters.

In block 620, after evaluating the engine modules for the ability to meet key thresholds, the engine modules not eliminated by the evaluation of the "use requirements" parameters may be evaluated for suitability based on the ability to meet other parameters, such as at least one user-defined preference. Examples of such user preferences may include fuel-type preferences, engine module vendor preferences, requested budget, and type of driving as described above.

In block 630, after evaluation of the engine module with regard to key thresholds and user preferences, the computing system may evaluate the engine module for the proposed usage using any other criteria deemed pertinent to engine module selection. In addition, a user may change the categorization of any given parameter to a threshold parameter if this parameter is considered to be especially important to the user. The computing system may determine the engine module use candidates which best meet as many of the key threshold and user preference criteria as possible, with the meeting of key threshold criteria being given priority for functional reasons. If no suitable use candidates are found by the determination process, a message to this effect may be sent to the requestor in a notification (described below).

In a transportation system configured as shown in FIG. 6, in which a computing system outside the modules conducts the use candidate determination, the analysis described above may be performed by computing system 113 for each individual engine module of the plurality of modules in the transportation system. The computing system 113 determines the most suitable candidate(s). The computing system 113 may have stored in memory information (designated 13*j* in the exemplary computing system 13 of FIG. 1) relating to the various autonomous engine modules 111-1 through 111-4 in a network (or under the control) of the computing system 113.

Referring to FIGS. 2 and 5, in a transportation system configured as shown in FIG. 5, the computing systems of individual engine modules 211 configured as shown in FIG. 2 may incorporate the same or substantially the same control logic as previously described with regard to computing system 13 (FIG. 1), for determining the engine module use candidates and for performing the other, related functions described. Thus, the computing system in each individual engine module 211 may be configured to receive an engine module request from a user or other entity, including a request that may have been received by another engine module and relayed to one or more additional modules in a network or plurality of modules via a communications network. However, the use candidate determination capability may be adapted in certain respects. For example, the computing systems of the individual engine modules may be configured to communicate and exchange information with each other for purposes of identifying suitable engine module use candidates for the proposed usage.

In addition, the computing system in each engine module may be configured to "self-evaluate" the suitability of the engine module in question for meeting user needs and requirements for a particular situation. Based on the self-evaluation, any given engine module may exclude itself from further consideration as a possible use candidate, for example due to scheduling conflicts, cost, estimated type of usage, or other factors as described above. Each self-evaluating engine module in the network may be configured to notify the receiving engine module as to whether or not the self-evaluating engine module determines itself to be suitable for the proposed use. The receiving module may be configured to maintain a record of the suitable modules for use in generating a notification to the user/requestor.

Referring back to FIG. 7, in block 520, when the above-described process is complete and one or more engine modules deemed suitable for the intended use have been determined, the computing system may generate a notification directed to a user including information relating to the at least one engine module use candidate. The notification may also prompt a user to select or confirm for use one of the proposed engine module use candidates. In a transportation system configured as shown in FIG. 5, the notification may be generated and transmitted to the requestor/user by the designated receiving engine module.

In block 530, a user/requestor may select (from a group of possible autonomous engine modules if more than one possible module is presented) or confirm (if only a single possible module is presented) an engine module that may be forwarded to connect with the user's passenger module on the selected usage date(s).

In block 540, responsive to user selection or confirmation of an engine module use candidate for use, a computing system (such as computing system 113 of FIG. 6 or a receiving engine module in the transportation system of FIG. 5) may provide a notification to the engine module candidate selected or confirmed for use. The information in the notification may include the date and time the selected engine module is to arrive at a designated location for docking or operative coupling to the passenger module, the length of time the engine module is to be used, the location of the passenger module at the designated time, user contact information, and any other information pertinent to locating and/or docking with the passenger module at the designated time. If the usage parameters or requirements need to be revised prior to the scheduled date, a new usage request may be initiated starting in block 502 and proceeding as just described.

In block 550, when the time for the scheduled use arrives, the selected engine module may drive itself to the designated pickup location, using the self-driving capability 83 previously described. For example, referring to FIG. 5, in a transportation system configured as shown, execution of the use candidate determination and selection process may result in the selection of engine module 211-1. This engine module would drive itself to the location of passenger module 200-*c* in time for the requested usage. Similarly, referring to FIG. 6, in a transportation system configured as shown, execution of the use candidate determination and selection process may result in the selection of engine module 111-1. This engine module would drive itself to the location of passenger module 100-*c* in time for the requested usage.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As will be appreciated by one skilled in the pertinent art upon reading the disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. In addition, various signals representing data, instructions or events as described herein may be transferred between a source and a destination in the form of electromagnetic waves traveling through signal-conducting media such as metal wires, optical fibers, and/or wireless transmission media e.g., air and/or space).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A computing system for an autonomous engine module, the computing system comprising one or more engine module computing system processors for controlling operation of the engine module computing system, and an engine module computing system memory for storing data and program instructions usable by the one or more engine module computing system processors, the engine module computing system memory storing a self-driving capability, the engine module computing system memory also storing data and program instructions that when executed by the one or more processors cause the one or more processors to:

determine, by communication between an autonomous engine module in which the computing system resides and at least one other autonomous engine module of a plurality of autonomous engine modules including the autonomous engine module in which the computing system resides, and responsive to a request by a user for use of an autonomous engine module of the plurality of autonomous engine modules, at least one suitable autonomous engine module use candidate from the plurality of autonomous engine modules;

generate, responsive to a determination of at least one suitable autonomous engine module use candidate from the plurality of autonomous engine modules, a notification directed to the user including information relating to the at least one suitable autonomous engine module use candidate;

receive a selection by the user of an autonomous engine module use candidate from the at least one suitable autonomous engine module use candidate; and using the self-driving capability, control the autonomous engine module to autonomously drive the autonomous engine module in which the computing system resides to a designated pickup location, responsive to selection by the user of the autonomous engine module in which the computing system resides as the autonomous engine module use candidate from the at least one suitable autonomous engine module use candidate.

2. The computing system of claim 1 wherein the engine module computing system memory stores instructions that when executed by the one or more engine module computing system processors cause the one or more processors to evaluate the autonomous engine module in which the computing system resides with regard to at least one key threshold parameter, to determine if the autonomous engine module in which the computing system resides is capable of satisfying the at least one key threshold parameter.

3. The computing system of claim 2 wherein the engine module computing system memory stores instructions that when executed by the one or more engine module computing system processors cause the one or more processors to, if the autonomous engine module in which the computing system resides is capable of satisfying the at least one key threshold parameter, evaluate the autonomous engine module in which the computing system resides with regard to at least one user preference, to determine if the autonomous engine module in which the computing system resides is capable of satisfying the at least one key threshold parameter and also capable of satisfying the at least one user preference.

4. The computing system of claim 1 wherein the engine module computing system memory stores instructions that when executed by the one or more engine module computing system processors cause the one or more processors to compare at least one of usage requirements and user preferences set forth in the user request for use of an autonomous engine module with known characteristics and capabilities of the autonomous engine module in which the computing system resides, to determine suitability of the autonomous engine module in which the computing system resides for an intended usage.

5. The computing system of claim 1 wherein the engine module computing system memory stores instructions that when executed by the one or more engine module computing system processors cause the one or more processors to eliminate the autonomous engine module in which the computing system resides as an autonomous engine module use candidate based on a failure of the autonomous engine module in which the computing system resides to satisfy at least one of a usage requirement and a user preference.

6. The computing system of claim 1 wherein the engine module computing system memory stores instructions that when executed by the one or more engine module computing system processors cause the one or more processors to:

evaluate an availability of the autonomous engine module in which the computing system resides during a requested date and time for a desired usage period; and eliminate the autonomous engine module in which the computing system resides from consideration as a use candidate if the autonomous engine module in which the computing system resides is unavailable during the requested date and time for the desired usage period.

7. The computing system of claim 1 wherein the engine module computing system memory stores instructions that when executed by the one or more engine module computing system processors cause the one or more processors to:
evaluate the autonomous engine module in which the computing system resides with regard to an estimated cost of a proposed usage of the at least one autonomous engine module; and
eliminate the autonomous engine module in which the computing system resides from consideration as a use candidate responsive to a result of the evaluation with regard to the estimated cost.

8. The computing system of claim 1 wherein the engine module computing system memory stores instructions that when executed by the one or more engine module computing system processors cause the one or more processors to:
evaluate the autonomous engine module in which the computing system resides with regard to a planned route relating to the request for use of an autonomous engine module; and
eliminate the autonomous engine module in which the computing system resides from consideration as a use candidate responsive to a result of the evaluation with regard to the planned route.

9. The computing system of claim 1 wherein the engine module computing system memory stores instructions that when executed by the one or more engine module computing system processors cause the one or more processors to:
evaluate the autonomous engine module in which the computing system resides with regard to at least one characteristic of a passenger module relating to the request for use of an autonomous engine module; and
eliminate the autonomous engine module in which the computing system resides from consideration as a use candidate responsive to a result of the evaluation with regard to the at least one characteristic of the passenger module.

10. The computing system of claim 1 wherein the engine module computing system memory stores instructions that when executed by the one or more engine module computing system processors cause the one or more processors to:
evaluate the autonomous engine module in which the computing system resides with regard to whether an object is to be towed by a passenger module relating to the request for use of an autonomous engine module; and
eliminate the autonomous engine module in which the computing system resides from consideration as a use candidate responsive to a result of the evaluation with regard to whether an object is to be towed by the passenger module.

11. The computing system of claim 1 wherein the engine module computing system memory stores instructions that when executed by the one or more engine module computing system processors cause the one or more processors to:
evaluate the autonomous engine module in which the computing system resides with regard to fuel preference of a user of a passenger module relating to the request for use of an autonomous engine module; and
eliminate the autonomous engine module in which the computing system resides from consideration as a use candidate responsive to a result of the evaluation with regard to the fuel preference of the user.

12. The computing system of claim 1 wherein the engine module computing system memory stores instructions that when executed by the one or more engine module computing system processors cause the one or more processors to:
evaluate the autonomous engine module in which the computing system resides with regard to a type of driving desired by a user relating to the request for use of an autonomous engine module; and
eliminate the autonomous engine module in which the computing system resides from consideration as a use candidate responsive to a result of the evaluation with regard to the type of driving desired by the user.

13. The computing system of claim 1 wherein the engine module computing system memory stores instructions that when executed by the one or more engine module computing system processors cause the one or more processors to:
evaluate the autonomous engine module in which the computing system resides with regard to an engine module vendor preference of a user relating to the request for use of an autonomous engine module; and
eliminate the autonomous engine module in which the computing system resides from consideration as a use candidate responsive to a result of the evaluation with regard to the engine module vendor preference.

14. The computing system of claim 1 wherein the engine module computing system memory stores instructions that when executed by the one or more engine module computing system processors cause the one or more processors to:
evaluate the autonomous engine module in which the computing system resides with regard to which sensors are present or absent on a passenger module relating to the request for use of an autonomous engine module; and
eliminate the autonomous engine module in which the computing system resides from consideration as a use candidate responsive to a result of the evaluation with regard to which sensors are present or absent on the passenger module.

15. A computer-implemented method comprising steps of:
determining, by communication between a first autonomous engine module and at least one other autonomous engine module of a plurality of autonomous engine modules including the first autonomous engine module, and responsive to a request by a user for use of an autonomous engine module of the plurality of autonomous engine modules, at least one suitable autonomous engine module use candidate from the plurality of autonomous engine modules;
generating, responsive to a determination of at least one suitable autonomous engine module use candidate from the plurality of autonomous engine modules, a notification directed to the user including information relating to the at least one suitable autonomous engine module use candidate;
receiving a selection by the user of an autonomous engine module use candidate from the at least one suitable autonomous engine module use candidate; and
controlling the first autonomous engine module to autonomously drive the first autonomous engine module to a designated pickup location responsive to selection by the user of the first autonomous engine module as the autonomous engine module use candidate from the at least one suitable autonomous engine module use candidate.

16. The method of claim 15 wherein the step of determining comprises a step of evaluating the first autonomous engine module with regard to at least one key threshold parameter, to determine if the first autonomous engine module is capable of satisfying at least one key threshold parameter.

17. The method of claim 16 wherein the step of determining comprises a step of, if the first autonomous engine module is capable of satisfying the at least one key threshold parameter, evaluating the first autonomous engine module with regard to at least one user preference, to determine if the first autonomous engine module is capable of satisfying the at least one key threshold parameter and also capable of satisfying the at least one user preference.

18. The method of claim 15 wherein the step of determining comprises a step of comparing at least one of usage requirements and user preferences set forth in the user request for use of an autonomous engine module with known characteristics and capabilities of the first autonomous engine module, to determine suitability of the first autonomous engine module for an intended usage.

19. The method of claim 15 wherein the step of determining comprises a step of eliminating the first autonomous engine module as an autonomous engine module use candidate based on a failure of the first autonomous engine module to satisfy at least one of a usage requirement and a user preference.

20. A non-transitory computer readable medium having stored therein instructions executable by a computer system to cause the computer system to perform functions, the functions comprising at least:

determining, by communication between a first autonomous engine module and at least one other autonomous engine module of a plurality of autonomous engine modules including the first autonomous engine module, and responsive to a request by a user for use of an autonomous engine module of the plurality of autonomous engine modules, at least one suitable autonomous engine module use candidate from the plurality of autonomous engine modules;

generating, responsive to a determination of at least one suitable autonomous engine module use candidate from the plurality of autonomous engine modules, a notification directed to the user including information relating to the at least one suitable autonomous engine module use candidate;

receiving a selection by the user of an autonomous engine module use candidate from the at least one suitable autonomous engine module use candidate; and controlling the first autonomous engine module to autonomously drive the first autonomous engine module to a designated pickup location responsive to selection by the user of the first autonomous engine module as the autonomous engine module use candidate from the at least one suitable autonomous engine module use candidate.

* * * * *